US00RE36675E

United States Patent [19]

Yamamoto et al.

[11] E Patent Number: Re. 36,675

[45] Reissued Date of Patent: Apr. 25, 2000

[54] GAME APPARATUS AND MEMORY CARTRIDGE USED THEREFOR

[75] Inventors: Masao Yamamoto; Takahiro Harada; Masaru Yamanaka, all of Kyoto, Japan

[73] Assignee: Nintendo Co., Ltd., Kyoto-fu, Japan

[21] Appl. No.: 08/564,725

[22] Filed: Nov. 29, 1995

Related U.S. Patent Documents

Reissue of:

[64] Patent No.: 5,265,888
Issued: Nov. 30, 1993
Appl. No.: 08/022,756
Filed: Feb. 19, 1993

U.S. Applications:

[63] Continuation of application No. 07/714,172, Jun. 14, 1991, abandoned.

[30] Foreign Application Priority Data

Jun. 22, 1990 [JP] Japan ..... 2-165125

[51] Int. Cl.[7] ..... A63F 9/22

[52] U.S. Cl. ..... 463/10; 463/23

[58] Field of Search ..... 463/10, 9, 1, 23; 364/410

[56] References Cited

U.S. PATENT DOCUMENTS

| | | |
|---|---|---|
| 4,415,153 | 11/1983 | Yokoi . |
| 4,905,147 | 2/1990 | Logg . |
| 4,922,420 | 5/1990 | Nakagawa et al. . |
| 5,014,982 | 5/1991 | Okada et al. . |

FOREIGN PATENT DOCUMENTS

| | | |
|---|---|---|
| 0268419 | 5/1988 | European Pat. Off. . |
| 3131587A1 | 6/1982 | Germany . |
| 3123328A1 | 9/1982 | Germany . |
| 31323238A1 | 9/1982 | Germany . |
| 3724449A1 | 1/1988 | Germany . |
| 2081110 | 2/1982 | United Kingdom . |
| 2209002 | 4/1989 | United Kingdom . |
| 83/02566 | 8/1983 | WIPO . |
| 83/03206 | 9/1983 | WIPO . |

OTHER PUBLICATIONS

Nintendo 'Game Boy Tetris: Instruction Booklet', 1989, pp. 1–18.

"Welltris Player's Guide", distrib. by Spectrum Holobyte, Released in the U.S. Oct. 6, 1989.

Ninetendo brochure:

*Primary Examiner*—Jessica Harrison
*Assistant Examiner*—Michael O'Neill
*Attorney, Agent, or Firm*—Nixon & Vanderhye P.C.

[57] ABSTRACT

A player initially sets the degree of difficulty of a display type game, and if desired, more than one player may participate with each player selecting an associated level of difficulty. First and second objects having different shapes, e.g. capsules and viruses, and different characteristics, e.g. different colors or shadings, are displayed in a predefined display area. First objects are generated based on random number data stored in a ROM and displayed as "falling" in a vertical direction across the predefined display area. Coordinate positions of the first objects on the display are changed by a player operating a controller. Second objects are displayed at arbitrary positions in the display area based on random number data. If a prescribed number of at least a portion of first objects and/or second objects having the same type characteristics are detected as being continuously aligned in a vertical or lateral direction, those continuously aligned objects are erased. Remaining portions of first objects (or remaining first objects) previously supported by erased objects are displayed as falling in the vertical direction to the lower region of the prescribed displayed area. When all second objects are erased, the game is successfully completed.

61 Claims, 15 Drawing Sheets

GAME APPARATUS AND MEMORY CARTRIDGE USED THEREFOR

Matter enclosed in heavy brackets [ ] appears in the original patent but forms no part of this reissue specification; matter printed in italics indicates the additions made by reissue.

This is a continuation of application Ser. No. 07/714,172, filed Jun. 14, 1991, now abandoned.

BACKGROUND OF THE INVENTION

1. Field of the Invention

The present invention relates to a game apparatus and a memory cartridge used therefor. More specifically, the present invention relates to a game apparatus used for a TV game machine for home use, a video game machine for business use, a portable game machine with liquid crystal display and so on, and to a memory cartridge used therefor.

2. Description of the Background Art

"TETRIS" game has been known as a puzzle game in which players play the game making various objects fall. In a game apparatus or a game system for playing this game, a plurality of types of blocks are displayed falling, which blocks are the examples of the objects including given number of squares combined. While a block is falling, the block is rotated by a predetermined angle by an operation by the player. When the block lands or it is stacked on a preceding falling block, falling of the said block is stopped. Lines of blocks aligned laterally are erased when the falling is stopped, and the display is cleared when a predetermined number of lines are erased.

The above described "TETRIS" game is a simple game in which only a plurality of blocks having different shapes are aligned laterally, and soon becomes monotonous and boring. In addition, blocks are the only characters appearing on the screen, and therefore this game has a simple dimensional quality. With those limitations it is difficult to develop a story that would make for an interesting game.

SUMMARY OF THE INVENTION

Therefore, an object of the present invention is to provide a game apparatus that is varied and engaging.

Another object of the present invention is to provide a game apparatus with various and many characters appearing.

A further object of the present invention is to provide a game apparatus allowing competition of multiple players.

A still further object of the present invention is to provide a game apparatus in which the degree of difficulty can be arbitrarily set dependent on skills of the players, e.g., when two players participate in the game.

A still further object of the present invention is to provide a memory cartridge used for the novel game apparatus.

The game apparatus in accordance with the present invention is adapted to display objects on display means having an object displaying area capable of displaying a plurality of first objects and/or second objects (the first and second objects include corresponding plurality of types) in vertical and lateral directions, and to change status of display of the display means based on the operation of operating means by a player and on data which are generated irregularly and automatically independent from the operation of the player, the game apparatus comprising first object data generating means, second object data generating means, stacked state detecting means, display controlling means, and continuously aligned state detecting means. The first object data generating means selects at random types of the first objects during the game, and intermittently generates data for displaying the first objects of the selected type. The second object data generating means selects at random types of the second objects and positions of display at the start of the game, and generates data for fixedly displaying the second objects of the selected type at the selected positions of display. The stacked state detecting means detects at least a portion of the first object, which is falling, being seemingly stacked on a second object and/or a first object which has fallen and *is* displayed fixedly. The display controlling means displays fixedly the second objects of the selected type based on the data generated from the second object data generating means at selected positions in the object displaying area, displays the first objects of the selected type based on the data generated from the first object data generating means as falling from an upper portion of the object displaying area at a given speed, changes the position of display of the falling first objects based on operation of the operating means, and stops falling of the first objects in response to a detection output from the stacked state detecting means. The continuously aligned state detecting means detects, after the detection of the stacked state by the stacked state detecting means, at least a certain number of the first objects and/or the second objects of a certain type displayed on the object displaying area being continuously aligned in a direction on the object displaying area, the number of which is smaller than the maximum number which can be displayed. The display controlling means further erases the display of the first objects and/or second objects which are detected to be continuously aligned, in response to the detection output from the continuously aligned state detecting means, and displays remaining first objects which have been supported only by the erased first object and/or second object, as successively falling.

A game apparatus in accordance with another aspect of the present invention is adapted to display objects on display means having an object displaying area capable of displaying a plurality of first objects and/or second objects (the first and second objects include a plurality of corresponding types) in vertical and lateral directions, and to change the state of display on the display means based on operation of operating means by a player and on data which are generated automatically and irregularly independent from the operation of the player, the game apparatus comprising first degree of difficulty setting means, second degree of difficulty setting means, first object data generating means, second object data generating means stacked state detecting means, display controlling means and continuously aligned state detecting means. The first degree of difficulty setting means variably sets the degree of difficulty with respect to a first change in the game based on the operation of the player, at the start of the game. The second degree of difficulty setting means variably sets the degree of difficulty with respect to a second change in the game based on the operation of the player, at the start of the game. The first object data generating means selects at random types of the first objects during the game, and intermittently generates data for displaying the first objects of the selected type. The second object data generating means selects at random the types of the second objects and positions of display of the same at the start of the game, and generates, in a manner corresponding to the degree of difficulty set by the second degree of difficulty setting means, the data for fixedly displaying the second objects of the selected type at the selected display positions. The stacked state detecting means detects at least a portion of the first object, which is falling, being seemingly stacked on the second object and/or a first object which has fallen and is fixedly displayed. The display controlling means fixedly displays the second objects of the type selected based on the data generated from the second object data generating means at the selected display positions of the object displaying area displays the first object of the type selected based on the data generated from the first object data generating means as falling from an upper portion of the object displaying area at a speed corresponding to the set degree of difficulty set by the first degree of difficulty setting means, changes the position of display of the falling first object based on operation of the operating means, and stops falling of the first object in response to a detection output from the stacked state detecting means. The continuously aligned state detecting means detects, after the detection of the stacked state by the stacked state detecting means, at least a prescribed number of the first objects and/or the second objects of a certain type displayed on the object displaying area being aligned continuously in a prescribed direction. The display controlling means further erases the display of the first objects and/or second objects which are detected to be continuously aligned, in response to the detection output from the continuously aligned state detecting [mean] *means*, and displays remaining first objects which have been supported by the erased first object and/or the second object only as successively falling.

A memory cartridge in accordance with the present invention is detachably attached to a game apparatus including a processing means and adapted to display objects on display means having an object displaying area capable of displaying a plurality of first objects and/or second objects (the first and second objects having a plurality of corresponding types prepared) in vertical and lateral directions and to change state of display of the display means based on the operation of operating means by a player and on data generated irregularly and automatically independent from the operation of the player, the memory cartridge comprising first object data storing means, second object data storing means, first program storing means, second program storing means and third program storing means. The first object data storing means stores data for intermittently displaying the first objects of an arbitrary type during the game. The second object data storing means stores data for displaying the second objects of an arbitrary type at arbitrary positions on the object displaying area of the display means at the start of the game. The first program storing means stores a stacked state detecting program for detecting at least a portion of the first object which is falling being seemingly stacked on the second object and/or a first object which has fallen and is displayed fixedly. The second program storing means stores a display control program for displaying the second objects of an arbitrary type at arbitrary positions on the object displaying area based on data read from the second object data storing means, displaying the first objects of an [arbitrarily] *arbitrary* type as falling from an upper portion of the object playing area at a given speed based on data read from the first object data storing means, changing position of display of the first objects which are falling based on operation of the operating means, and for stopping falling of the first objects in response to detection of the stacked state based on the stacked state detecting program. The third program storing means stores a continuously aligned state detecting program for detecting, after the stacked state is detected based on the stacked state detecting program, that at least a prescribed number of the first objects and/or the second objects of a certain type displayed on the object displaying area being continuously aligned in a direction on the object displaying area, the number of continuous objects being smaller than the maximum number which can be displayed. The processing means included in the game apparatus displays the second objects based on the data read from the second object data storing means and on the display control program, changes the state of display of the fast objects based on the display control program and the data read from the first object data storing means, detects the first object which is falling being seemingly stacked on the second object and/or a first object which has fallen and is displayed fixedly based on the stacked state detecting program, detects the first objects and/or second objects which are continuously aligned based on the display control program and on the continuously aligned state detecting program, erases the display thereof, and displays remaining first objects which have been supported only by the first objects and/or the second objects which have been erased as successively falling.

In accordance with the present invention, the game includes combination of the first objects which are displayed as falling, the position of which can be determined by the operation of a player, and second objects which are displayed fixedly at positions selected at random at the start of the game, and therefore, compared with the conventional "TETRIS" game in which blocks only are displayed as characters, a game apparatus which is abound in variety and attractive to the user can be provided.

According to the present invention, there are a plurality of types of the first and second objects, respectively, and when at least a prescribed number of the first objects and/or the second objects of one type are continuously aligned in a prescribed direction, the first objects and/or the second objects which are continuously aligned are erased. Therefore, compared with the conventional "TETRIS" game in which blocks are erased when they are aligned in one line in lateral direction, a game apparatus can be provided which requires strategical determination, which is more interesting and less boring.

In addition, according to the present invention, since the first objects and the second objects can be displayed as completely different characters, a game apparatus can be provided in which the story as a game can be easily developed and very much expanded.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 7 to 9B are flow charts for describing the operation of one embodiment of the present invention, in which FIG. 7 is a flow chart of the main routine, FIG. 8 is a flow chart of menu display and select display, and FIGS. 9A and 9B are flow charts of a game subroutine and a continuously aligned state determining process subroutine.

FIGS. 10a–10f and 11a–11f show the display on the screen of the game machine for describing the operation of one embodiment of the present invention, wherein FIG. 10 shows a case in which one player plays the game, and FIG. 11 shows a case in which two players play the game.

DESCRIPTION OF THE PREFERRED EMBODIMENTS

Figure 1A:
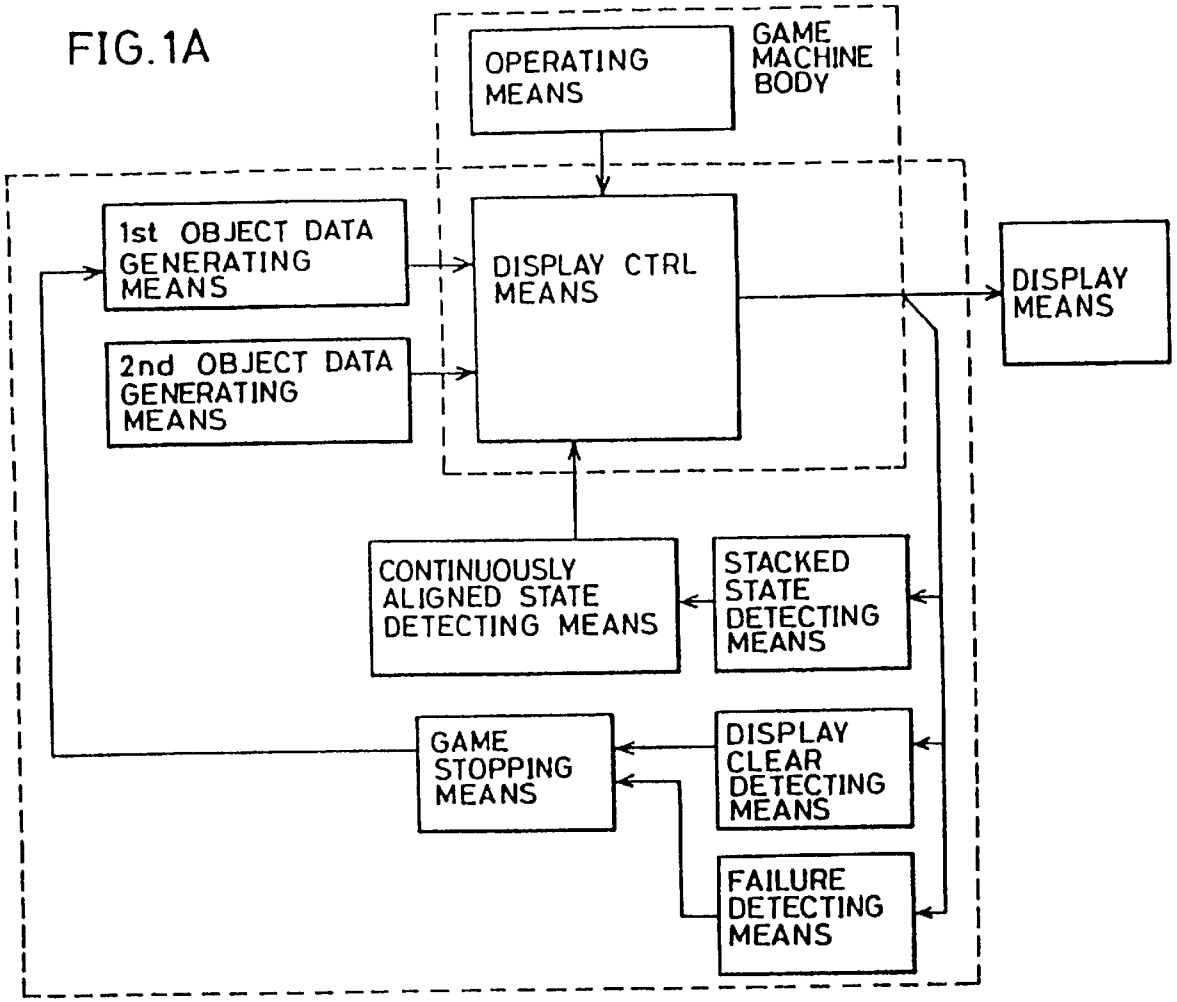
FIG. 1A is a first diagram for illustrating the principle of one embodiment of the present invention in accordance with a first aspect.

FIG. 1A is a first diagram showing the principle of one embodiment of the present invention, which will be described later, in accordance with a first aspect. Referring to FIG. 1A, the game apparatus includes a game machine body (hereinafter referred to as a game machine) and a cartridge which is detachably attached to the game machine. The game machine includes operating means and display controlling means. The display means may be externally connected to the game machine, or it may be built in the game machine, as in the case of a liquid crystal game machine. The cartridge includes first and second object data generating means, display control means, stacked state detecting means and continuously aligned state detecting means. Since the functions of the respective means have been described in the summary of the invention, the description is not repeated.

The cartridge may include display clear detecting means, failure detecting means and game stopping means, as needed. The display clear detecting means detects the display being cleared based on the fact that the second objects are all erased. The failure detecting means detects a failure state when position of display of the first object immediately after the start of falling, displayed on the object displaying area, reaches the uppermost portion. The game stopping means stops generation of data from the first object data generating means, in response to the detection of the failure state by the failure detecting means or the detection of the display clear state by the display clear detecting means.

In a more preferred embodiment, respective means included in the cartridge are set as program data in a semiconductor memory.

Figure 1B:
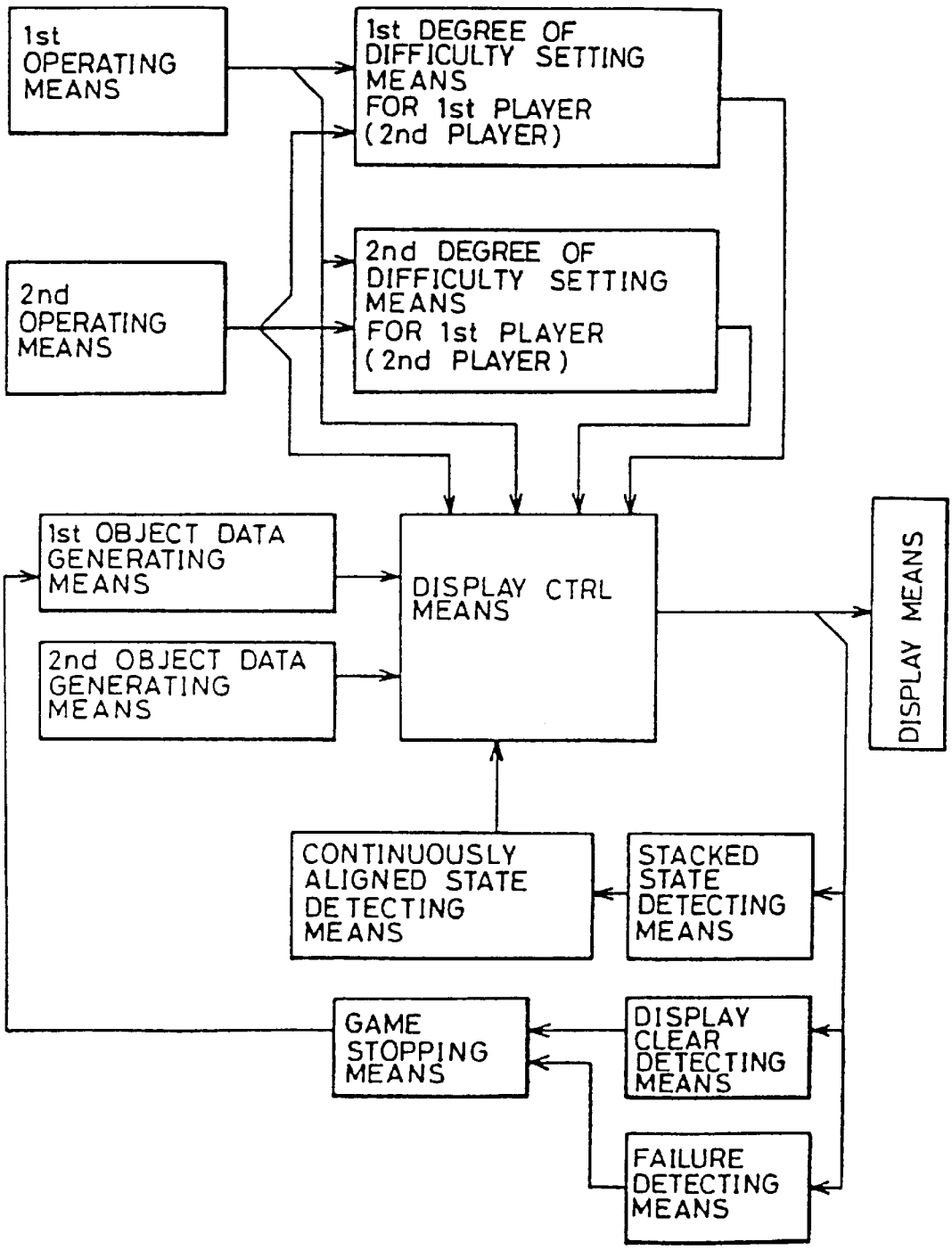
FIG. 1B is a second diagram for illustrating the principle of one embodiment of the present invention in accordance with a second aspect.

FIG. 1B is a second diagram showing the principle of one embodiment of the present invention, which will be described later, in accordance with a second aspect. The diagram of principle of FIG. 1B differs from that of FIG. 1A in that it includes first degree of difficulty setting means and second degree of difficulty setting means [are] provided in relation to the first operating means. The functions of the first and second degree of difficulty setting means are as described in the summary of the invention. More preferably, two sets of operating means (first and second operating means) are provided to allow competition type game between two players, and the first and second degree of difficulty setting means separately set the degree of difficulty of the two players, by the operation of the operating means. Consequently, when two players play a competition game, there will be appropriate handicap provided corresponding to the skills of the players.

[In the following one] *One* embodiment of the present invention *is* applied to a TV game machine for home use (commercial name "family computer") commercially available from the assignee of the present invention. However, it should be noted that the technical concept of the present invention can be applied to various game machines such as liquid crystal game machines, personal computers, video game machines for business use and so on.

Figure 2A:
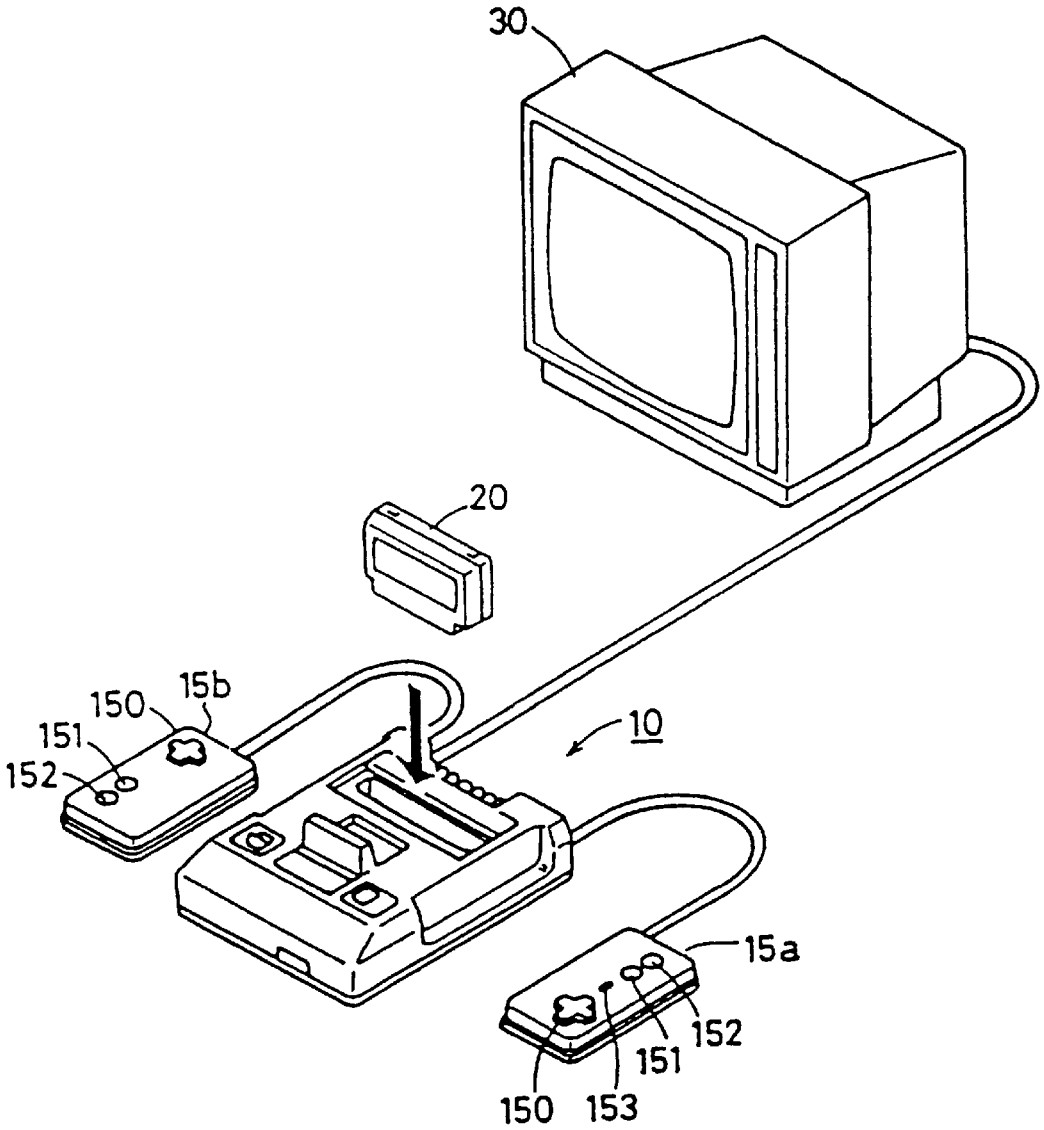
FIG. 2A is a perspective view showing an appearance of the game apparatus in accordance with one embodiment of the present invention.
Figure 2B:
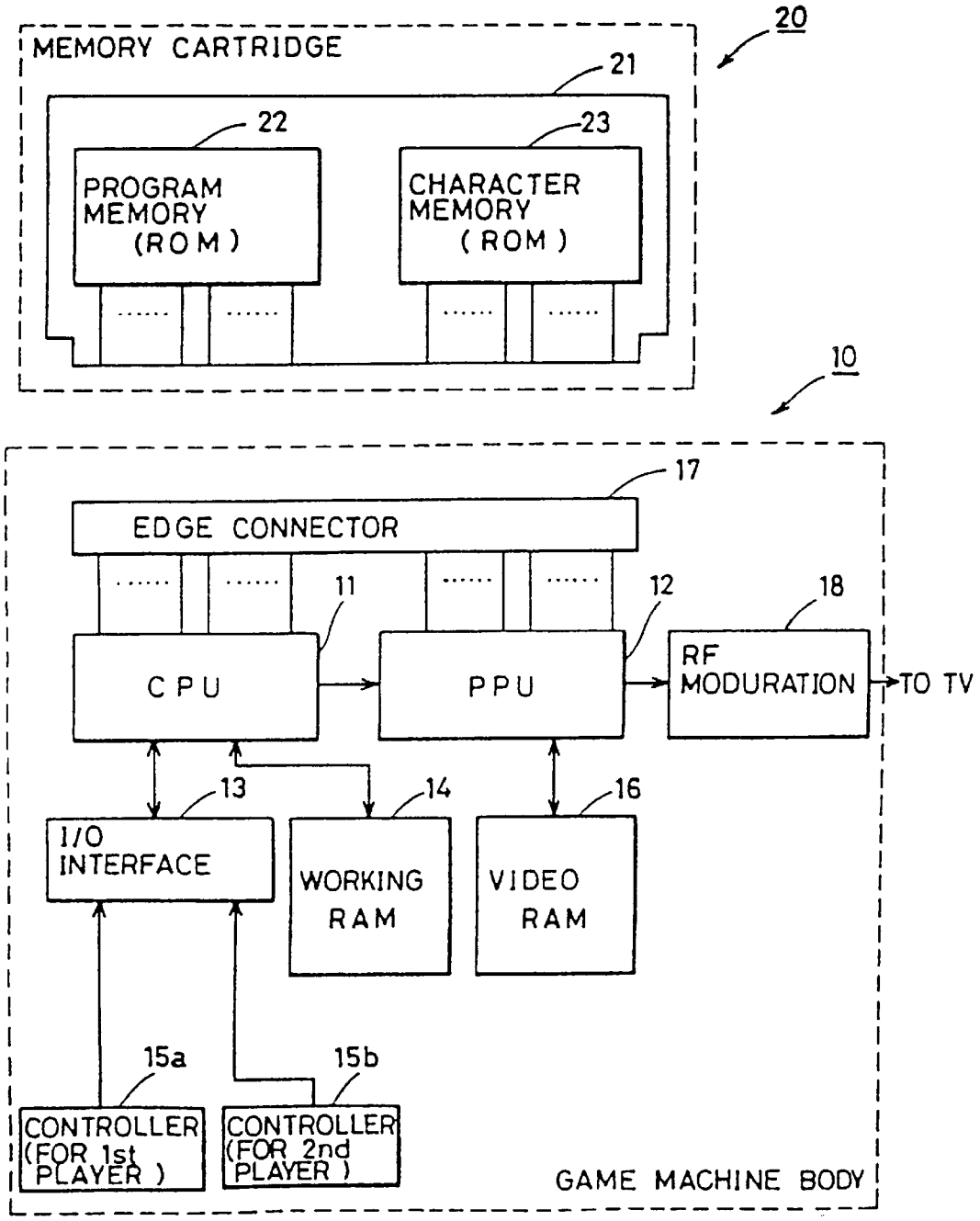
FIG. 2B is a block diagram showing structures of main portions of the game apparatus in accordance with one embodiment of the present invention.
Figure 2C:
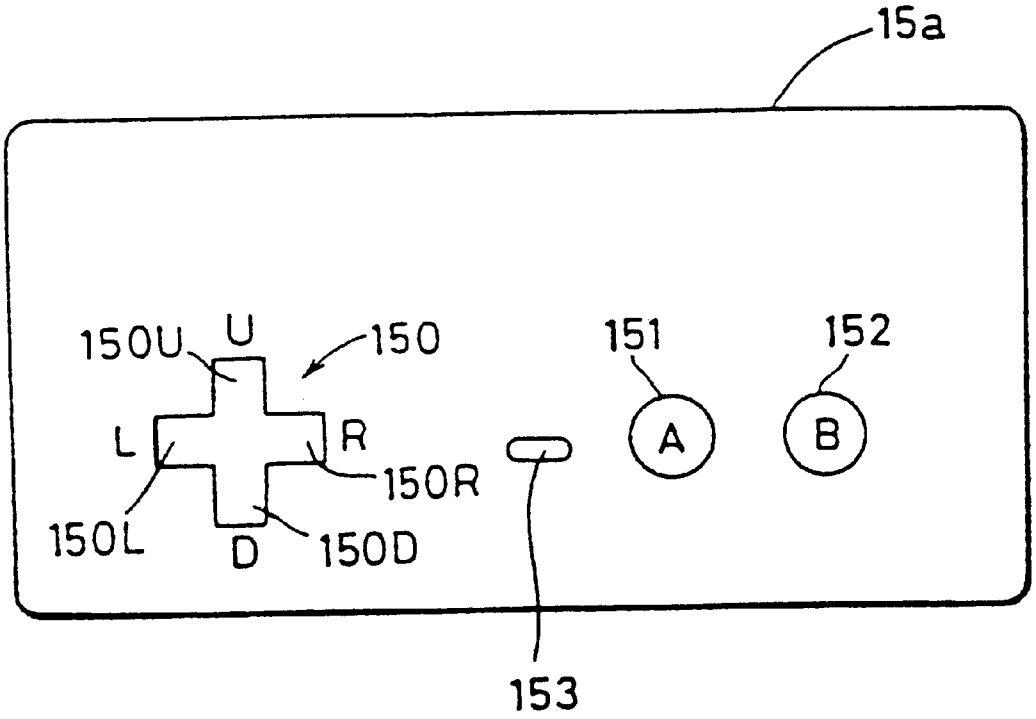
FIG. 2C is a front view showing a key arrangement of a controller used in one embodiment of the present invention.

FIG. 2A is a perspective view showing the appearance of the game apparatus in accordance with one embodiment of the present invention. FIG. 2B is a block diagram showing in detail the structures of the main portions of the game apparatus in accordance with one embodiment of the present invention. FIG. 2C is a front view showing key arrangement of a controller used in one embodiment of the present invention. The structure of the game apparatus in accordance with one embodiment of the present invention will be described in the following with reference to FIGS. 2A to 2C.

As shown in FIG. 2B, the game machine 10 includes a central processing unit (hereinafter referred to as CPU) 11 having arithmetic operating function and control function. To the CPU 11, a picture processing unit (hereinafter referred to as a PPU) 12, an input/output (hereinafter referred to as I/O) interface 13, and a working RAM 14 which will be described with reference to FIG. 4 later, are connected. An operator (first controller) 15a for a first player and an operator (second controller) 15b for a second player, which are examples of the operating means, are connected to the I/O interface 13. A video RAM (V-RAM) 16 for storing background image of 1 image plane is connected to the PPU 12. An edge connector 17 for detachably connecting the memory cartridge 20 is connected to the CPU 11 and the PPU 12. Further, output from the PPU 12 are applied to a color television receiver for home use which is an example of the display means, through an RF modulator 18.

Figure 6:
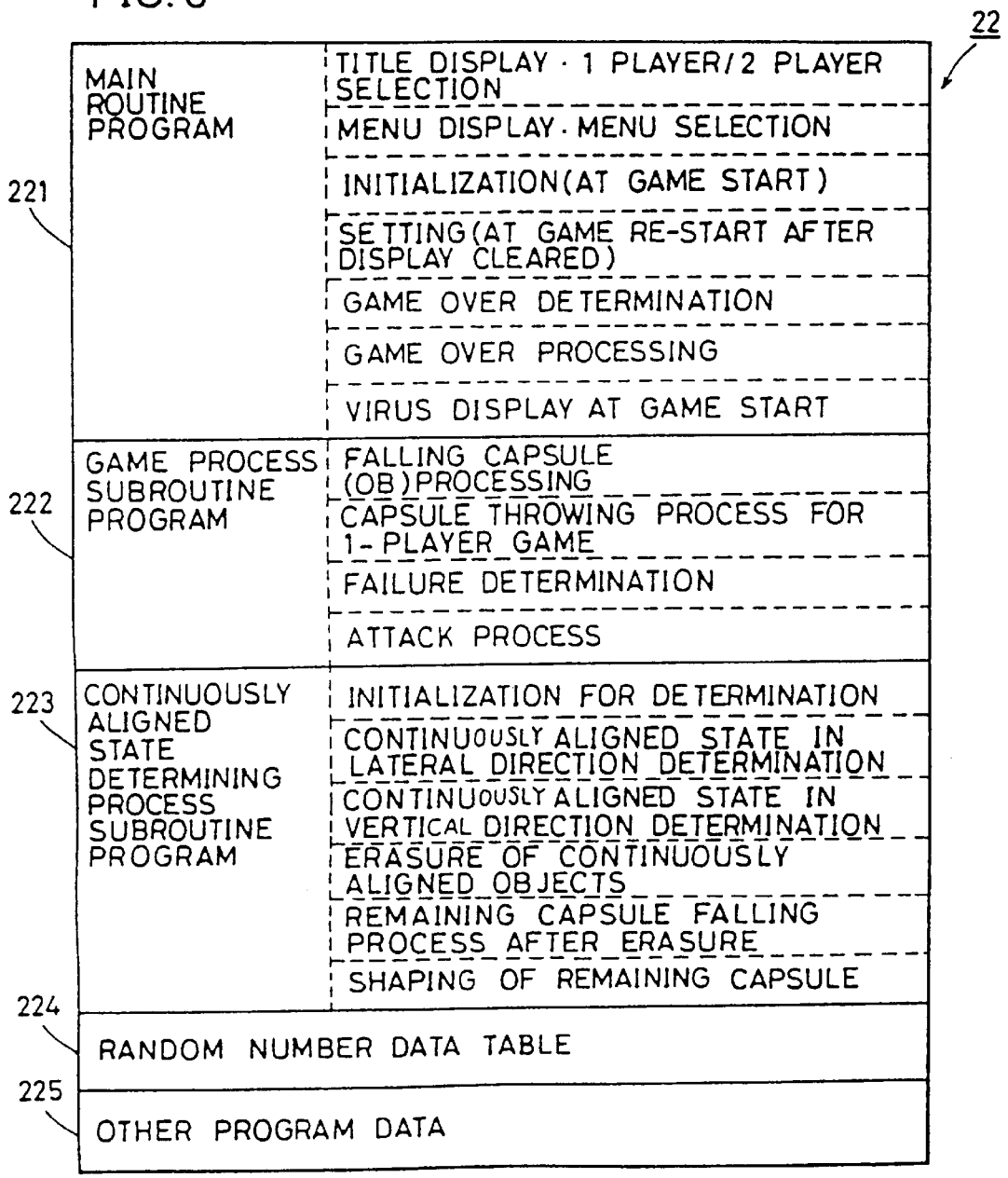
FIG. 6 is a schematic diagram showing, in illustration, memory regions of a program memory of FIG. 2B.

Meanwhile, the memory cartridge 20 includes a program memory 22 and a character memory 23 attached on a circuit board 21. The program memory 22 and the character memory 23 are formed of, for example, ROMs (Read Only Memories). The program memory 22 stores [a] program data such as shown in FIG. 6, which will be described later, constitutes the first and second object data generating means together with the character memory 23, and constitutes the display control means in [corporation] *cooperation* with the CPU 11 and the PPU 12. A direction designating key 150 having a cross-shape for example, a A button 151 and a B button 152 are provided an each of the controllers 15a and 15b. The controller 15a further includes a start switch 153, as shown in FIG. 2C.

Figure 3:
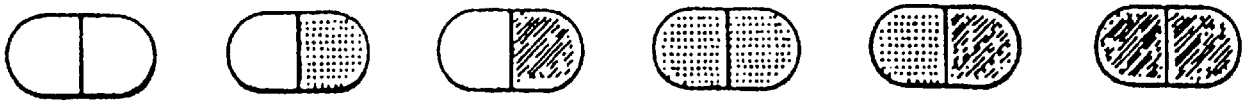
FIG. 3 shows types of capsules which is one example of the first object.

The first and second objects are characters for the game, as shown in FIGS. 10 and 11, and they are defined in the following manner, for example. Namely, the first object is a character having a shape of a capsule such as shown in FIG. 3, the type of which is specified or identified by color or density. If the display means is a display capable of color representation, such as a color television 30, the types of the capsules are specified or identified by three colors, for example red, yellow and blue. If the display means is a display capable of black and white display, such as a liquid crystal display, the type of the capsules are specified or identified by three densities, that is, white, gray and black. Preferably, a capsule is divided into two, and the divided two pieces may be of the same type or they may be of the different type. A capsule generated on the display screen is moved or rotated by the operation of the controller 15a or 15b by the player. For example, the capsule is rotated by 90° in the clockwise direction every time A button 151 of the controller 15a or 15b is pressed. It is moved by 1 character in the left, every time a left projecting portion 150L of the direction designating key 150 is pressed. It is moved by 1 character in the right when the right projecting portion 150R of the direction designating key 150 is pressed. The capsule is rotated by 90° in the counter clockwise direction every time B button 152 of the controller 15a or 15b is pressed, and it falls at the maximum speed when the lower projection portion 150d of the direction designating key 150 is pressed.

The second object is automatically displayed independent from the operation of the player. The number of the objects and/or the number of stacks of the objects are determined based on the levels set at the start of the game. The second object has a shape of a virus or a bug, for example. There are three types of the second objects corresponding to the types of the capsules as the first objects.

In the game apparatus of the present embodiment, it *is* intended that the second objects (virus) fixedly displayed in the object displaying area having a shape of a bottle, for example, are erased by the first objects (capsules) which are dropped into the object displaying area. The types of capsules (color or density) dropped into the object displaying area are selected at random corresponding to random number data. A capsule dropped from above the object display area "falls" toward the bottom of the object displaying area. While it falls, it may be rotated or moved in the lateral direction in response to the operation of the controller 15a or 15b by the player. When the capsule lands on the bottom of the object displaying area or it is "stacked" on an object (i.e. a virus and/or a [capsule which] *capsule*) *which* is in a fixed position in the object displaying area, the [thrown] *dropped* capsule is stopped at that stacked position. At this time, a determination is made whether [or not or not] at least a prescribed number of objects (for example, 4) of the same type (e.g., capsules and/or [virus] *viruses* of the same color) are aligned continuously in the vertical or lateral direction (hereinafter this state is referred to as a "continuously aligned state"). If more than that prescribed number of the objects of the same type are detected to be aligned continuously in the vertical or lateral direction, those continuously aligned objects (capsules and/or viruses) are erased. Any capsule *or* capsule portion [supported by] having been *supported* only *by* an erased object falls and stops at the bottom of the object displaying area or on another object (capsule and/or virus). At this time, if a continuously aligned state is detected again, the display of the objects which are in the continuously aligned state [are] *is* erased.

Therefore, it is possible to erase a plurality of lines of aligned objects by dropping one capsule. The erasing operation of the objects is repeated until the continuously aligned state can not be detected anymore. If the continuously [state] aligned *state* is not detected, a next capsule is generated and dropped into the object displaying area. If the virus cannot be erased successfully and the dropped capsules are stacked up to the inlet of the object displaying area (the mouth of the bottle), the game is over and the game is stopped. If the viruses in the object displaying area are all erased, the game was successful, and the player can precede to the next level of the game (having higher difficulty). By using the game apparatus of the present embodiment, one player or two players may participate in the game.

Figure 4:
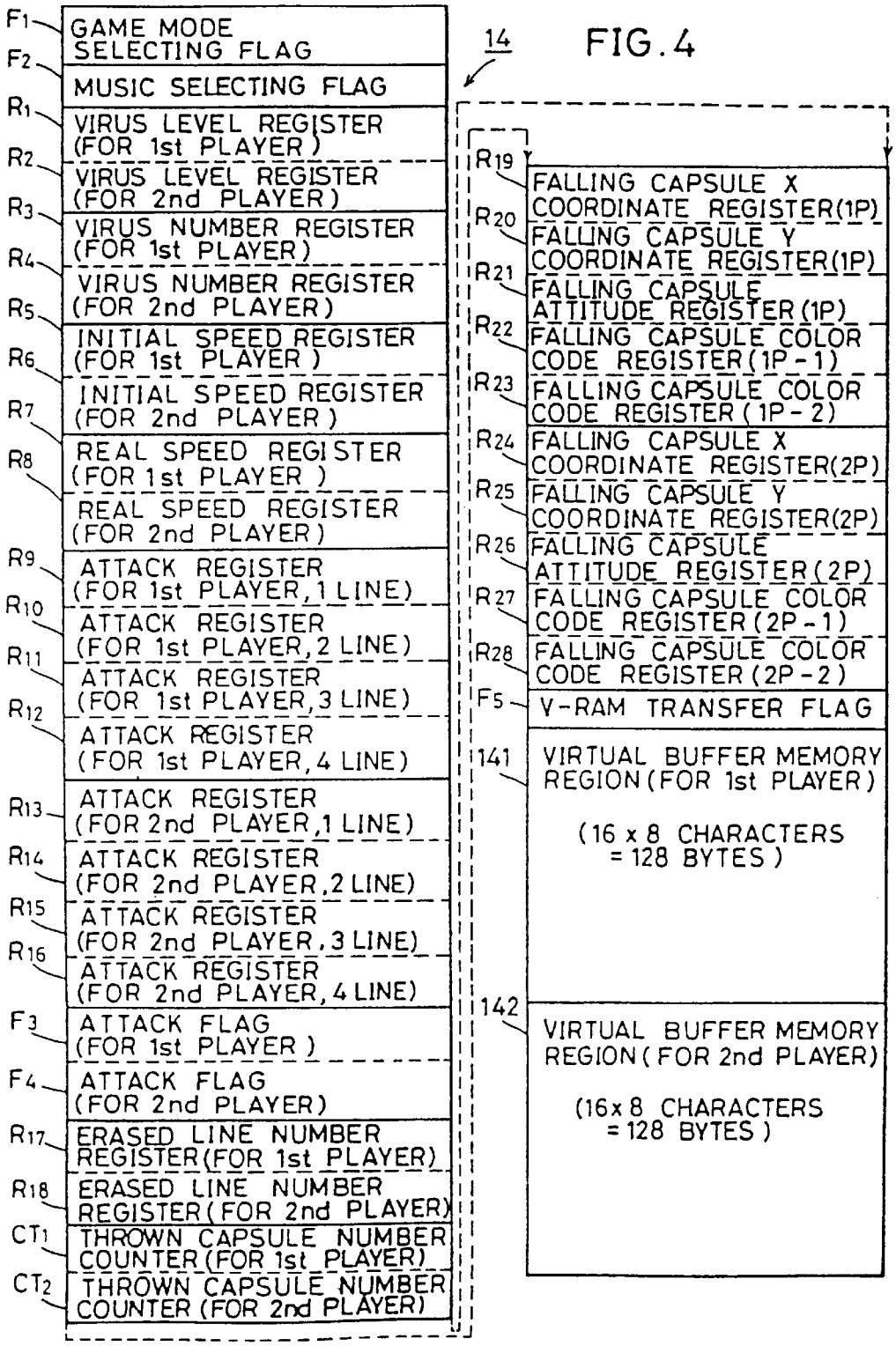
FIG. 4 is a schematic diagram showing, in illustration, memory regions of a working RAM.

FIG. 4 is a schematic diagram illustrating the memory region of the working RAM shown in FIG. 2B. The working RAM 14 includes a plurality of flag regions F1 to F5, register regions R1 to R28, counter regions CT1 and CT2 and virtual buffer memory regions 141 and 142. A game mode selecting flag F1 included in the flag region temporarily stores whether one player game mode or two players game mode is selected by the player at the start of the game. A music selection flag F2 temporarily stores the music selected by the player. Attacking flags F3 and F4 temporarily stores that an attack on the counter player is taking place when the game is played by two players (in competition type game). A V-RAM transfer flag F5 indicates that the data in the virtual buffer memory region 141 or 142 is being transferred to the V-RAM 16.

Virus level registers R1 and R2 included in the register region separately store levels of viruses *which* are set by the player at the start of the game for each player. Virus number registers R3 and R4 separately store the number of viruses during the game for each player. To the virus number registers R3 and R4, a value which is decremented by one every time one virus is erased by the corresponding player is loaded. Initial speed registers R5 and R6 separately store data of initial falling speed of capsules set at the start of the game for each player. The real speed registers R7 and R8 separately store [rear] *real* time falling speed data of the capsules, which is increased every time a prescribed number of capsules is generated for each player.

Attack registers R9 to R16 store the types of objects which are in the continuously aligned state (color code or density code) for each line, in the series of operations from dropping one capsule until the capsule [ends] *lands*. The attack registers R9 to R12 are allotted to the first player, while the attack registers R13 to R16 are allotted to the second player. Erased line number registers R17 and R18 separately store the number of lines of the objects in the continuously aligned state during the series of [operation] *operations* from [throwing] *dropping* of one capsule to the [end of falling] *landing*, for each player.

Falling capsule data registers R19 to R28 store X and Y coordinate data, attitude data and two color codes of the falling capsule. The falling capsule data registers R19 to R23 are allotted to the first player, and the falling capsule data registers R24 to R28 are allotted to the second player. The falling capsule is processed as a moving picture character, and after it lands, it is processed as a background character. Therefore, display coordinates of the falling capsule are determined by the X coordinate data and Y coordinate data.

Figure 5:
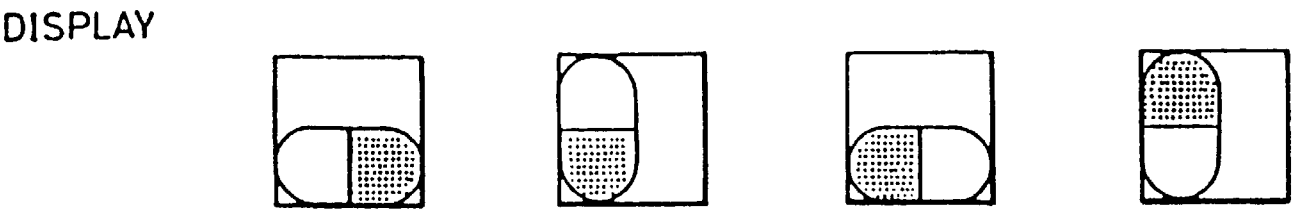
FIG. 5 shows relation between attitude data and the attitude of a capsule.

The attitude of the falling capsule is determined as shown in FIG. 5 based on the attitude data 0 to 3 stored in the register R21 or R26. More specifically, the attitude data 0 to 3 correspond to figures shifted by 90°, respectively. Color code registers R22 and R27 store *a* color code of one of the halves of one capsule, and color code registers R23 and R28 [stores] *store a* color code of the other one of the halves. Capsule number counters CT1 and CT2 count separately the number of dropped capsules for each player, and they are used to change the speed of falling of the capsules every time a prescribed number of capsules are dropped.

The virtual buffer memory region 141 for the first player and the virtual buffer memory region 142 for the second player both have the storage capacity of 16×8=128 bytes and respective addresses are determined to correspond to the display coordinates of the capsules and/or viruses. Binary codes indicating the types of the capsules and/or viruses to be displayed are written to respective addresses of the virtual buffer memory regions 141 and 142. The capsules and/or viruses are continuously aligned as described above, codes indicating that there is no object to be displayed are written to the addresses corresponding to the positions on which the continuously aligned capsules and/or viruses are to be displayed. The virtual buffer memory regions 141 and 142 are provided in addition to the V-RAM 16 to display a still picture in order to facilitate and to increase the speed of detection of continuously aligned states corresponding to the ever changing state of display of the capsules. The character codes for actual display on the television display receivers 30 are written in the V-RAM 16. The data stored in the virtual buffer memory regions 141 and 142 are written to the V-RAM 16 for updating, in a slightly delayed manner after the character codes stored in V-RAM 16 have been displayed.

FIG. 6 is a schematic diagram illustrating the data stored in the program memory shown in FIG. 2B. The program memory 22 includes a main routine program storing region 221, a game process subroutine program storing region 222, continuously aligned state determining process subroutine program storing region 223, random number data able region 224 and other program data storing region 225.

Stored in the main routine program storing region 221[,] are: a program for executing the operations of the main routine shown in FIG. 7, which will be described later; a program for displaying a title screen for selecting either the [one player] *one-player* game or [two player] *two-player* game; a program for processing selection of menu by displaying a menu on the screen; an initialization program; program for setting re-start of the game after the display is cleared (i.e., game of one level is finished successively); game over determining program; game over processing program; and program for displaying viruses at the start of the game.

Stored in the game process subroutine program storing region 222 are: a program for processing falling capsules as objects; a program for processing capsules throwing display for one-player game; a failure determining program; and attack processing program in [two player] *two-player* game.

Stored in the continuously aligned state determining process subroutine program storing region 223 are: a determination initialization program; *a* program for a [process] for determining continuously aligned state in lateral direction; a program for processing determination of a continuously aligned state in the vertical direction; *a* program for erasing display of capsules and/or viruses which are continuously aligned; a program for making fall capsules which have been supported by the erased capsules and/or viruses only; and a program for shaping a shape of a half of a capsule remaining unerased so as to change the shape to a circle.

In the random number data table region 224 fixedly stored are random number data for generating different [number] *numbers* (and/or stages) of viruses corresponding to the virus level set, and to determine types of the capsules to be generated.

The game apparatus of the present embodiment executes processes for the game with the CPU 11 carrying out the operations in accordance with the flow chart shown in FIGS. 7 to 9B, based on the various program data stored in the program memory 222.

Figure 7:
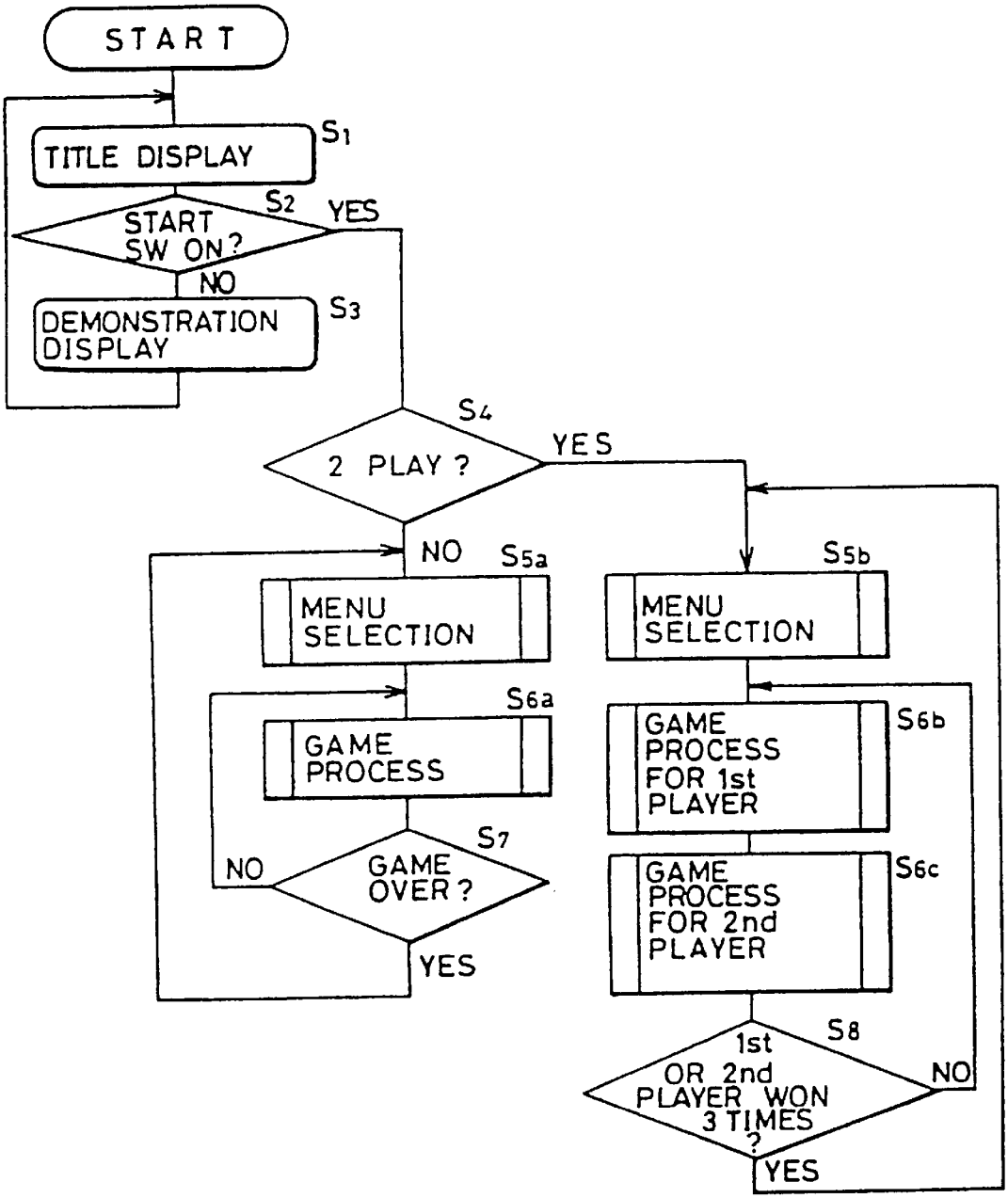
Figure 8:
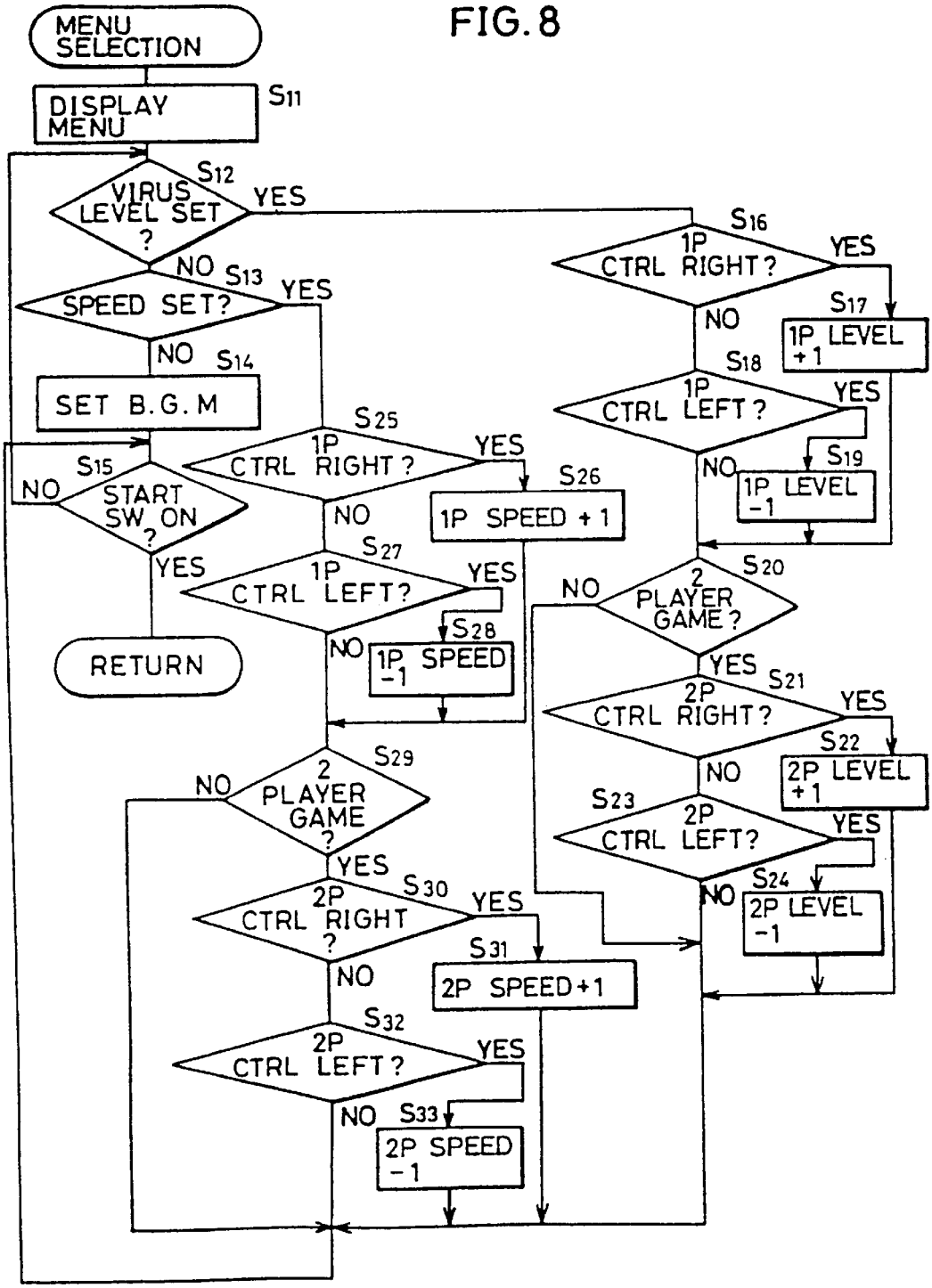
Figure 9A:
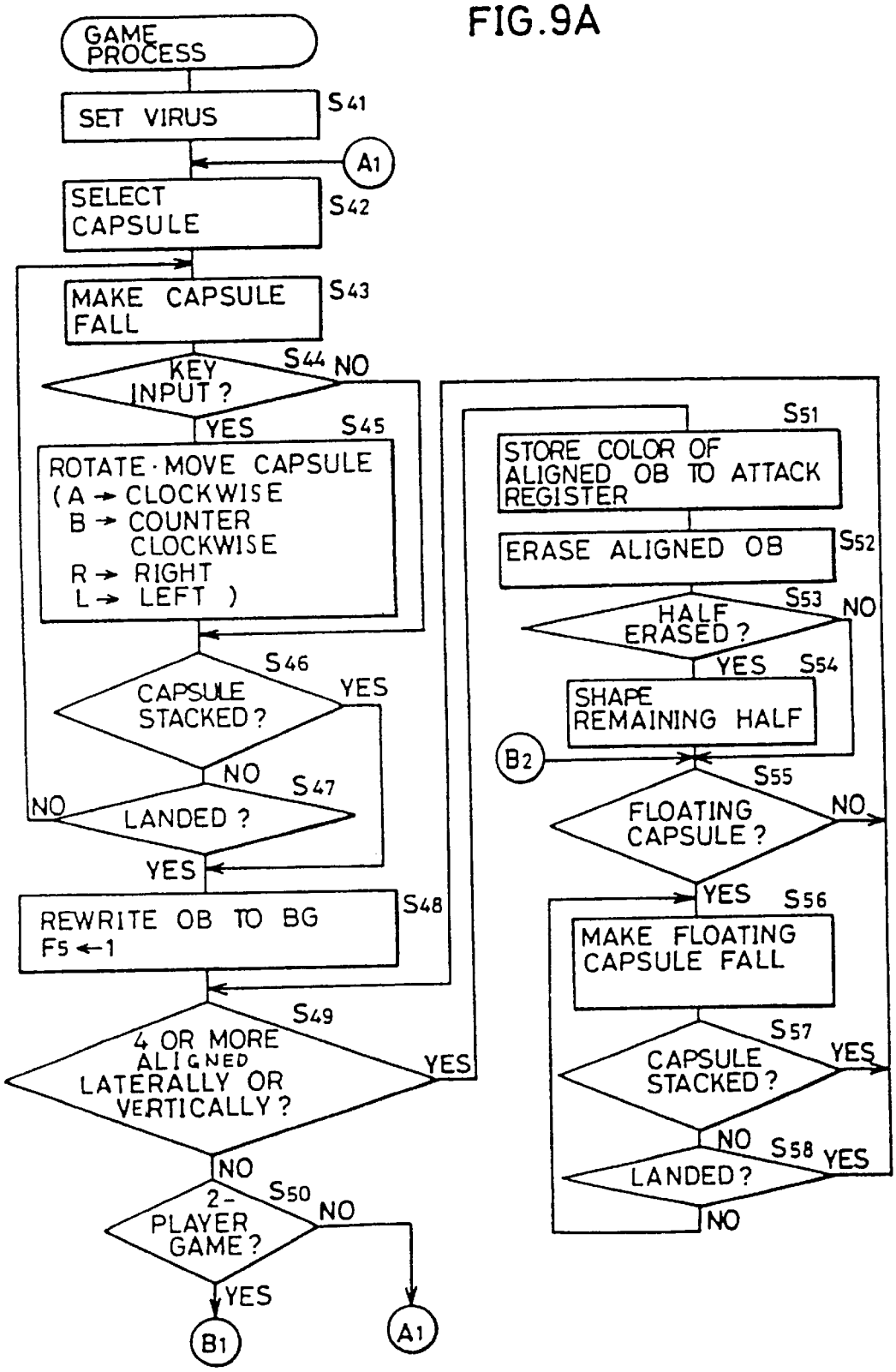
Figure 9B:
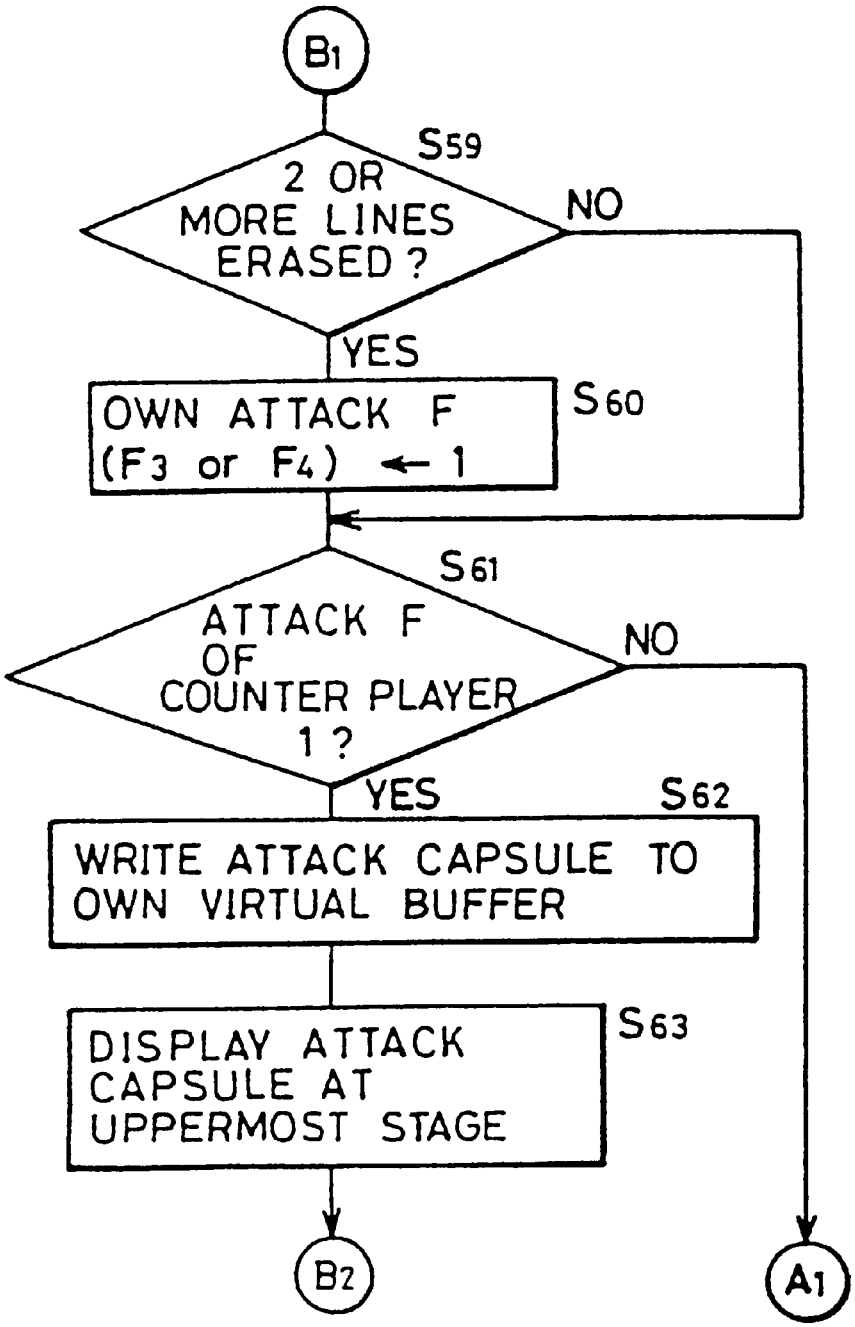

FIGS. 7 to 9B are flow charts showing the operation of one embodiment of the present invention. FIG. 7 is a flow chart of the main routine; FIG. 8 is a flow chart with respect to display of menu and selection; and FIGS. 9a and 9B are flow charts of a game subroutine and a continuously aligned state determining process subroutine, respectively.

FIGS. 10 and 11 are illustrations of exemplary display screens to assist in understanding operation of one embodiment of the present invention. FIG. 10 shows a case in which one player plays the game and FIG. 11 shows a case in which two players play the game.

In the following, one embodiment of the present invention will be described with the operation in [one player] *one-player* game mode and the operation of [two player] *two-player* game mode described separately.

(1) Operation in one-player game mode

The operation in the one-player game mode will be described with reference to FIGS. 2 to 9B and 10.

After the cartridge 20 is attached to the game machine 10 and the power switch is turned on, a title is displayed on the screen as shown in FIG. 10 (a) in step (simply denoted by "S") 1. In step 2, whether or not a start switch 153 provided on the controller 15a is pressed is determined. A demonstration display is continuously displayed in step 3 until the start switch 153 is pressed.

Figure 10A:
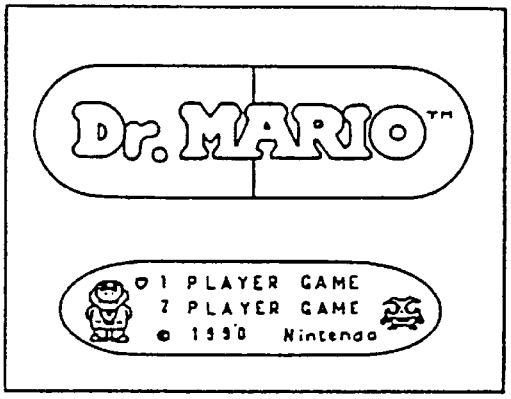
Figure 10B:
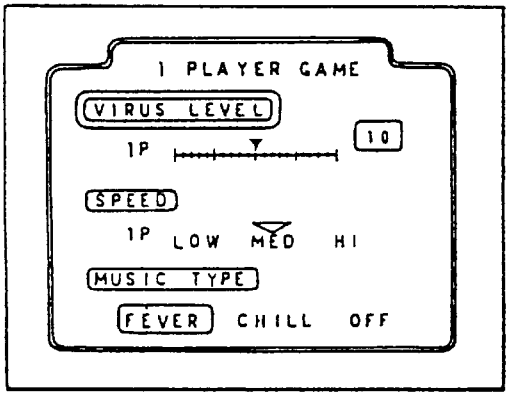

When a player presses the start switch 153, it is detected in step 2 and the flow proceeds to step 4. In step 4, when a game mode selection mark on the title screen shows that game with two players is not selected, it is determined that the game is [done not] *played* by [two players] *one player,* and in the next step 5a, menu display and selecting process are executed. More specifically, referring to the flow chart of FIG. 8, the following processes are executed. First in step 11, a menu display such as shown in FIG. 10(b) is displayed. At this time, if the player does not operate the controller 15a, the following processes are executed. First, in step 12, it is determined whether the virus level is set, in step 13 it is determined whether the speed is set, in step 14 a music for the game is set, in step 15 it is determined whether the start switch 153 is pressed, and then the flow returns to the step 12 and the above described operations are repeated.

If the player wishes to set the virus level, he presses an upper projecting portion 150U or a lower projecting portion 150D of the direction designating key 150 on the controller 15a for the first player to select the virus level setting mode, and then he presses the left projecting portion 150L or the right projecting portion 150R of the direction designating key 150. In response, it is determined in step 12 that it is the virus level setting mode, and then in step 16, whether or not the right projecting portion 150R of the direction designating key 150 is pressed is determined. If the right projecting portion 150R of the direction designating key 150 has been pressed, 1 is added to the value of the virus level register R1 in step 17. Conversely, if the left projecting portion 150L of the direction designating key 150 has been pressed, it is determined in step 16 that the right projecting portion is not pressed, and in step 18, it is determined that the left projecting portion 150L of the direction designating key 150 has been pressed. Next, in step 19, 1 is subtracted from the value of the virus level register R1. In this manner, the virus level is set.

After the setting of the virus level, it is determined in step 20 whether it is the two-player game mode, and then the control returns to step 15. In this manner, every time the right projecting portion 150R or the left projecting portion 150L of the direction designating key 150 is pressed in the virus level setting mode, the operations of the steps 12 to 15 and 16 to 20 are repeated until the start switch 153 is pressed.

If the player wishes to set the speed, he presses the upper projecting portion 150U or the lower projecting portion 150D of the direction designating key 150 of the controller 15a to select the speed selecting mode, and then he presses the left projecting portion 150L or the right projecting portion 150R of the direction designating key 150. In response, it is determined in step 13 that it is the speed setting mode, and in the next step 25, whether or not the right projecting portion 150R of the direction designating key 150 has been pressed or not is determined. If the right projecting portion 150R of the direction designating key 150 has been pressed, 1 is added to the value of the initial speed register R5 in step 26. Conversely, if the left projecting portion 150L of the direction designating key 150 has been pressed, it is confirmed in step 25 that the right projecting portion 150R has not been pressed, and then it is determined in step 27 that the left projecting portion 150L of the direction designating key 150 has been pressed. Then, in step 28, 1 is subtracted from the value of the initial speed register R5. In this manner, initial speed is set. After the initial speed is set, it is determined that it is not the two-player game mode in step 29, and the flow returns to step 15. In this manner, every time the right projecting portion 150R [for] *or* the left projecting portion 150L of the direction designating key 150 is pressed in the speed setting mode, the operations of the steps 12 to 15 and 25 to 28 are repeated until the start switch 153 is pressed.

After the setting of the virus level and the setting of the speed are completed, the player presses the start switch 153. In response, pressing of the start switch 153 is confirmed in step 15, the flow returns to the main routine of FIG. 7 and the flow proceeds to the game process subroutine of step 6a. Details of the game process subroutine are shown in FIGS. 9A and 9B.

In the game process subroutine, in step 41 of FIG. 9A, character codes of viruses to be displayed at the start of the game are written to the V-RAM 16 and in the virtual buffer memory region 141 for the first player. At this time, the types and positions of the viruses to be written to the V-RAM 16 and to the virtual buffer memory region 141 for the first player are determined based on the random number data stored in the table 224, and the numbers of the viruses are determined based on the virus level set in the register R1. Then, the flow proceeds to step 42 in which types of capsules to be dropped into to the object displaying area are determined based on the random number data stored in the table 224, data indicating the types of the capsules are stored in the registers R22 and R23, attitude data, initially (0), [is] *are* stored in the register R21, and coordinate data of the initial [throwing] *dropping* position of the capsules are stored in the registers R19 and R20. Then, in step 43, the program [process] for causing capsules to fall is carried out based on the real time falling speed data of the capsules stored in the register R7 (however, until a prescribed number of capsules have been dropped, at the same speed as the initial speed of falling stored in the register R5).

In the next step 44, it is determined whether or not there is any key input of the controller 15a. If there is any, the control proceeds to step 45, and otherwise, the control skips step 45 and proceeds to step 46. If there is any key input, a program [process] for changing the state of a capsule, namely to rotate or move the capsule is carried out in step 45. At this time, if A button 151 is pressed, the capsule is rotated in the clockwise direction, and it is rotated in the counterclockwise *direction* if B button 152 is pressed. The capsule is moved to the right if the right projecting portion 150R of the direction designating key 150 is pressed, and it moves to the left if the left projecting portion 150L of the direction designating key 150 is pressed. The capsule falls at the maximum speed if the lower projecting portion 150D of the direction designating key 150 is pressed. To realize these program processes, the CPU 11 rewrites data in the registers R19 to R21 corresponding to the operation of the controller 15a.

In step 46, a determination is made whether or not the capsule is stacked on a virus (a virus and/or a capsule, if there is any capsule which has fallen). If the capsule is not stacked on any virus or capsule, it is determined whether or not the capsule landed on the bottom of the object displaying area in step 47. If it is NO, the control returns to the step 43. Operations of the steps 43 to 47 described above are repeated until the capsule is stacked on a virus and/or other capsules, or until the capsule lands on the bottom of the object displaying area. In this manner, by the operations in the steps 43 to 45, a capsule falls based on the real time falling speed data stored in the register R7, and changes are made on the capsule based on the state of operation of the controller 15a.

Figure 10C:
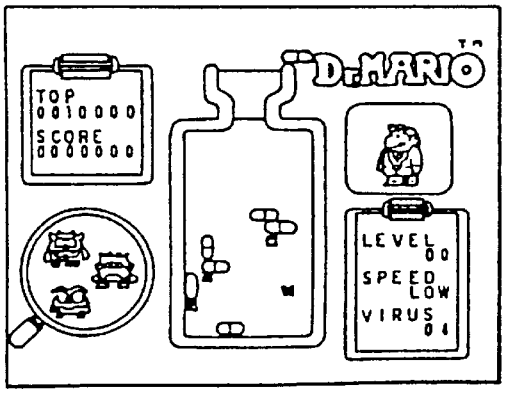
Figure 10D:
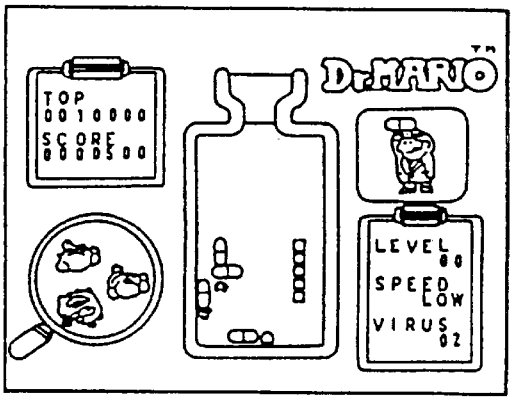
Figure 10E:
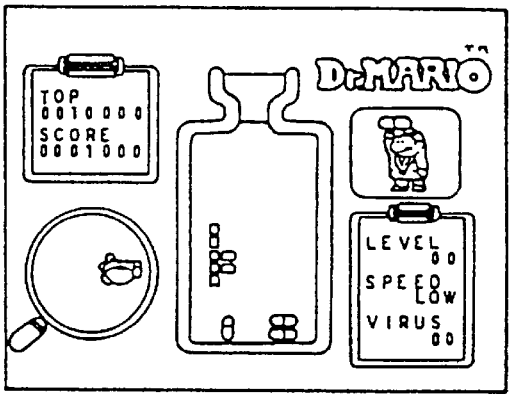
Figure 10F:
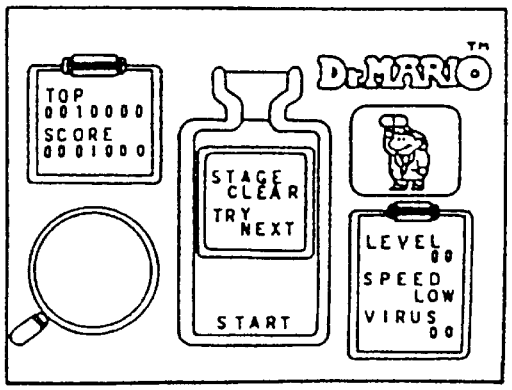

If it is determined in step 46 that the capsule is stacked on a virus and/or another capsule, or it is determined in step 47 that the capsule has landed, logic "1" is set in the V-RAM transfer flag F5, so as to switch the display of the capsule character from a moving picture display to a background picture display. Consequently, the CPU 11 transfers data of types of viruses and capsules loaded in the virtual buffer memory region 141 to the V-RAM 16 through the PPU 12. Then, in step 49, whether at least a prescribed number of the same type (same color or density) of objects including viruses and/or capsules displayed on the object displaying area are continuously aligned in the vertical direction and/or lateral direction (the prescribed number is smaller than the maximum number of objects which can be displayed in the vertical or lateral direction of the object displaying area, for example, 4) is determined. If the objects of the same type are not aligned continuously for 4 or more, then it is determined in step 50 that the game mode is not the two-player game mode, and the program returns to step 42. This operation is repeated until four or more objects of the same type are aligned in the vertical or lateral direction. FIG. 10(c) shows one example of display of this state.

Then, the CPU 11 executes the process for determining the continuously aligned state, based on the continuously aligned state determining process subroutine program (operation program following step 49) stored in the program storing region 123. More specifically, when four or more objects of the same type (capsules and/or viruses) are aligned continuously in the lateral or vertical direction, the [state] continuously aligned state is determined in step 49, and the control proceeds to step 51. In step 51, color data indicative of the type of the capsules and/or viruses which are continuously aligned are stored in the attack register R10. Then, in step 52, only the contour of capsules and/or viruses which are continuously aligned is displayed, and then erased. At this time, data (all zero) indicating that there is nothing to be displayed are written to the corresponding addresses of the buffer region storing the types of the capsules and/or viruses of the line to be erased. When the viruses are erased, a value corresponding *to* the number of erased viruses is subtracted from the value stored in the register R3. Therefore, number of remaining viruses is stored in the register R3.

In step 53, it is determined whether or not there is a capsule half of which is erased. If the shape of the capsule one half of which has been erased is left as it is, it is difficult to determine whether or not there is a continuously aligned state. Therefore, in step 54, the remaining half of the capsule is shaped. By this shaping process of the step 54, the shape of the remaining half of the capsule is made a circle. Then, the program proceeds to step 55 in which whether or not there is a capsule floating in the air as a result of erasure of capsules and/or viruses is determined. The capsule floating in the air means a capsule which has been supported only by the erased capsules and/or viruses so as not to fall. As the capsules and/or viruses which have supported the capsule are erased, the capsule is left floating in the air. Only a half of a capsule which has left unerased may float in the air. If there is no capsule floating in the air, the program returns to step 49. If there is any, the program proceeds to step 56. In step 56, process for making fall the capsule floating in the air is execute. More specifically, codes of the capsule which is floating in the air are successively written to addresses corresponding to the coordinate positions below the buffer memory region 141. In this manner, in the game apparatus of the present embodiment, display of a capsule which is not supported is controlled such that the capsule is [always] made [falling] *to fall* to the bottom.

Then, in step 57, whether or not the capsule which is made [falling] *to fall* in step 56 has been stacked on a virus and/or a capsule displayed below is determined. If there is no stacked state detected, the program proceeds to step 58 to determine whether or not the capsule landed on the bottom of the object displaying area. If the capsule has not yet landed on the bottom of the object displaying area, the program returns to step 56 again. Thereafter, the operations of the steps 56 to 58 are repeated until a falling capsule is stacked on a virus and/or a capsule or until it lands on the bottom of the object displaying area. If a stacked state is detected in step 57 or if landing of the capsule is detected in step 58, the control returns to step 49. Thereafter, whether or not there is a continuously aligned state is determined again, and if there is any, such capsules and/or viruses are erased. Therefore, when a floating capsule falls and [accidentally] a continuously aligned state is *accidentally* generated, capsules and/or viruses which the player did not intend to erase may be erased. Such coincidence makes the game more interesting.

The operations of the steps 49 and 51 to 58 are repeated until there are no more continuously aligned states of the capsules and/or viruses. If it [are] *is* determined that there [is] *are* no continuously aligned states in step 49, the program proceeds to S50 and then returns to step 43 in which the next capsule begins to fall. Thereafter, similar game processes are executed. When capsules are stacked to a [throwing] *dropping* position of the capsule (the uppermost position of theft displaying area), a game over is determined in step 7 and process for game over is executed. Then, the flow returns to the operation of step 5a. Meanwhile, if erasing of all viruses is performed successively, it is determined that this level of the game is cleared. Then, similarly, the program returns to step 5a and the game is started again.

(2) Operation in two-player same mode

Figure 11A:
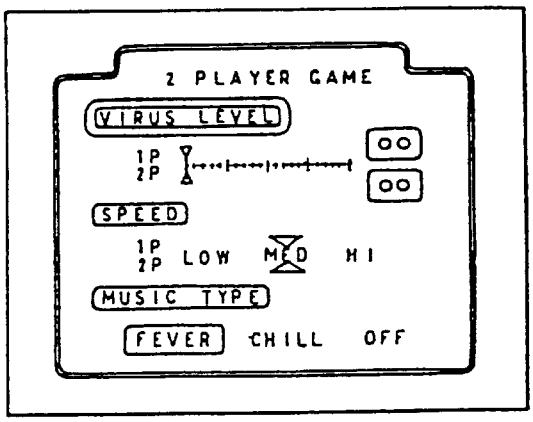

When two players play a competition type game, the players operate the direction designating key 150 while [15] the title is displayed on the screen in step 1 to select the [two player] *two-player* game mode. Then, the players press the start switch 153. In response, in step 2, it is determined to be the [two player] *two-player* game mode (play) in step 4, and the program proceeds to step 5b. In step 5b, a menu display is given such as shown in FIG. 11(a), and selection of menu is done. The subroutine program in this case is done in accordance with the program shown in FIG. 8, in the same manner as in the one player game mode. In this case, setting of the virus level and setting of initial speed of the first player is the same as those in the one-player game mode.

Meanwhile, setting of the virus level and setting of the initial speed of the second player are done in steps 20 to 24 and in steps 29 to 33. Since these operations are the same as those of the first player except that the register R2 is used instead of the register R1 for storing the level setting value and that a register R6 is used instead of the register R5 for storing the initial sped setting value, the detailed description thereof is not repeated.

As described above, in the present embodiment, when two players play the game in competition, the virus level and the initial speed can be separately set for the first and second players, [the] *either* player can be handicapped with respect to the virus level and the initial speed, by setting the degree of difficulty separately, corresponding to the difference in skill or technique. Therefore, when two players compete, there will be fewer easy victories and more close games.

Figure 11B:
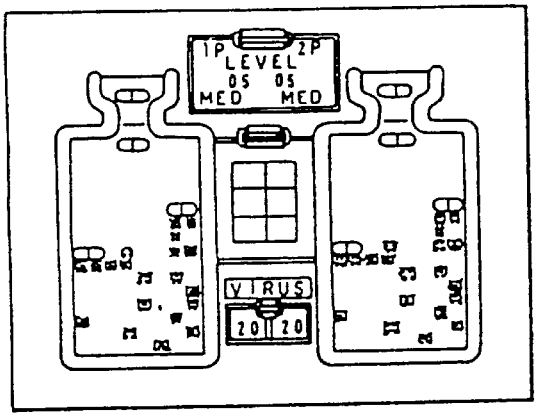
Figure 11C:
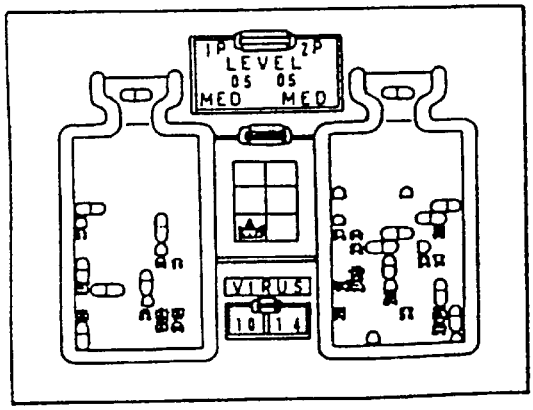
Figure 11D:
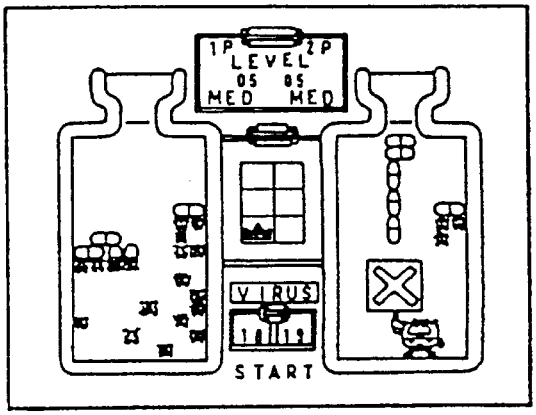
Figure 11E:
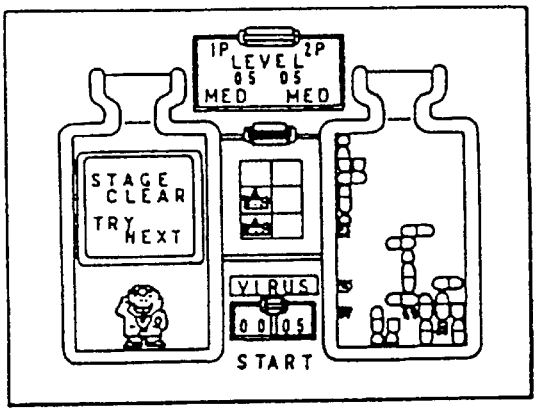
Figure 11F:
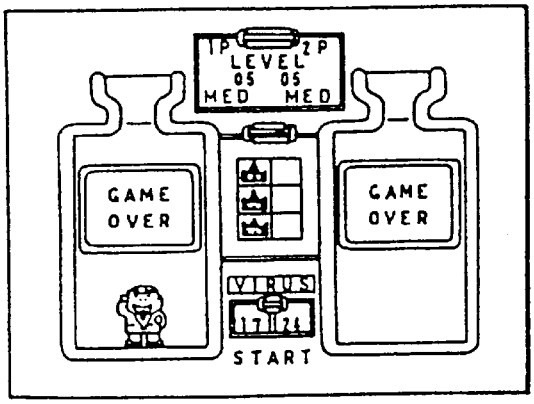

The game process subroutine in the two-player game mode includes game processes for the first player in step 6b and game processes for the second player in step 6c. The displays on the screen during the game processes are as shown in FIGS. 11(b), (c), (d), (e) and (f). More specifically, the game process subroutine of FIGS. 9A and 9B are described above [are] *is* repeated twice for each player. However, the register or the buffer memory for updating the data are changed to ones corresponding to the second player in the game process for the second player, and flags and counters are also changed to ones corresponding to the second player. Therefore, operations described with respect to the one-player game mode are omitted as much as possible. In the following, operations inherent to the [two players] *two-player* game mode, that is, attacking operation will be described in detail. However, two object displaying areas are provided for the two players as shown in FIG. 11, so that one player can adapt appropriate tactics in consideration of the state of the game of the other player.

In step 50 of the above described continuously aligned state determining subroutine, when it is determined to be the [two player] *two-player* game mode, the control proceeds to step 59 of FIG. 9B. In step 59, it is determined whether or not two or more lines of the viruses and/or capsules are erased corresponding to dropping [of] one capsule, based on the data stored in the attack registers R9 to R12 or R13 to R16. If two or more lines of viruses and/or capsules have been erased, logic "1" indicating attacking is written to an attack flag of the player who has erased two or more lines (attack flag F3 when the game process subroutine of the first player is being executed, and attack flag F4 when the game process subroutine of the second player is being executed) in step 60. Meanwhile, if erasure of two or more lines of viruses and/or capsules is not detected in step 59, attack on the counter player is not carried out. Therefore, the flow skips step 60 and proceeds to step 61. In step 61, whether or not logic "1" is set in the attack flag of the counter player is checked. If logic "1" is set in the attack flag of the counter player (the attack flag F4 when the game process subroutine for the first player is being executed, and the attack flag F3 when the game process subroutine for the second player is being executed) the flow proceeds to step 62 in which data representing an attack capsule (for example, a capsule whose size is one half that shown in FIG. 3 and having the same color as color code stored in the attack register of the counter player) are written to an address corresponding to the uppermost portion of a line in the player's own buffer memory 141 or 142. In the next step 63, an attack capsule is displayed on the uppermost portion of the object displaying area of the [players] *player's* own side. The number of attack capsules displayed at this time is determined corresponding to the number of lines of the capsules and/or viruses which [have] *has* been erased on the side of the counter player. For example, when two lines have been erased, one attack capsule appears, when three lines have been erased, two attack capsules appear, and when four lines have been erased, four attack capsules appear. Thereafter, the flow returns to step 55 and the operations in the steps 56 to 58 and 49 to 55 are carried out. Therefore, the attack capsules are displayed as falling.

The player who is being attacked cannot move the attack capsules falling in the corresponding object displaying area in [neither] *either* left [nor] *or* right direction. Therefore, the attacking capsule may prevent formation of the continuously aligned state, or conversely, the attack capsule may help formation of the continuously aligned state accidentally. Therefore, the player being attacked can play the game assisted or obstructed by arbitrary factors beyond that player's control. A player who is attacking benefits because he can force the counter player to change his tactics and to develop the game advantageously.

If it is determined in step 61 that logic "1" is not set in the attack flag of the counter player, the program returns to step 42 and a next capsule is thrown.

The above described game process subroutine is carried out for the first player and for the second player successively. If the game of the first or second player is completed, the program returns to the main routine, and in step 8, whether the first or second player has won three games is determined. If neither of the first and second players has won three times, a mark representing the number of [winning] *victories* is displayed on the winner side, and the flow returns to step 6a. Meanwhile, if it is determined that the first or the second player has won three times, the program returns to step 5 in which the menu is displayed again, and the game is started.

In the above described embodiment, a color television receiver was used as the display means. However, the present invention may be applied to a portable game apparatus with a dot matrix liquid crystal display (for example, a game apparatus commercially available under the commercial name of "game boy" manufactured and sold by the [applicant] *assignee* of the present invention). An embodiment of the present invention applied to a portable game apparatus having liquid crystal display will be described in the following.

Figure 9C:
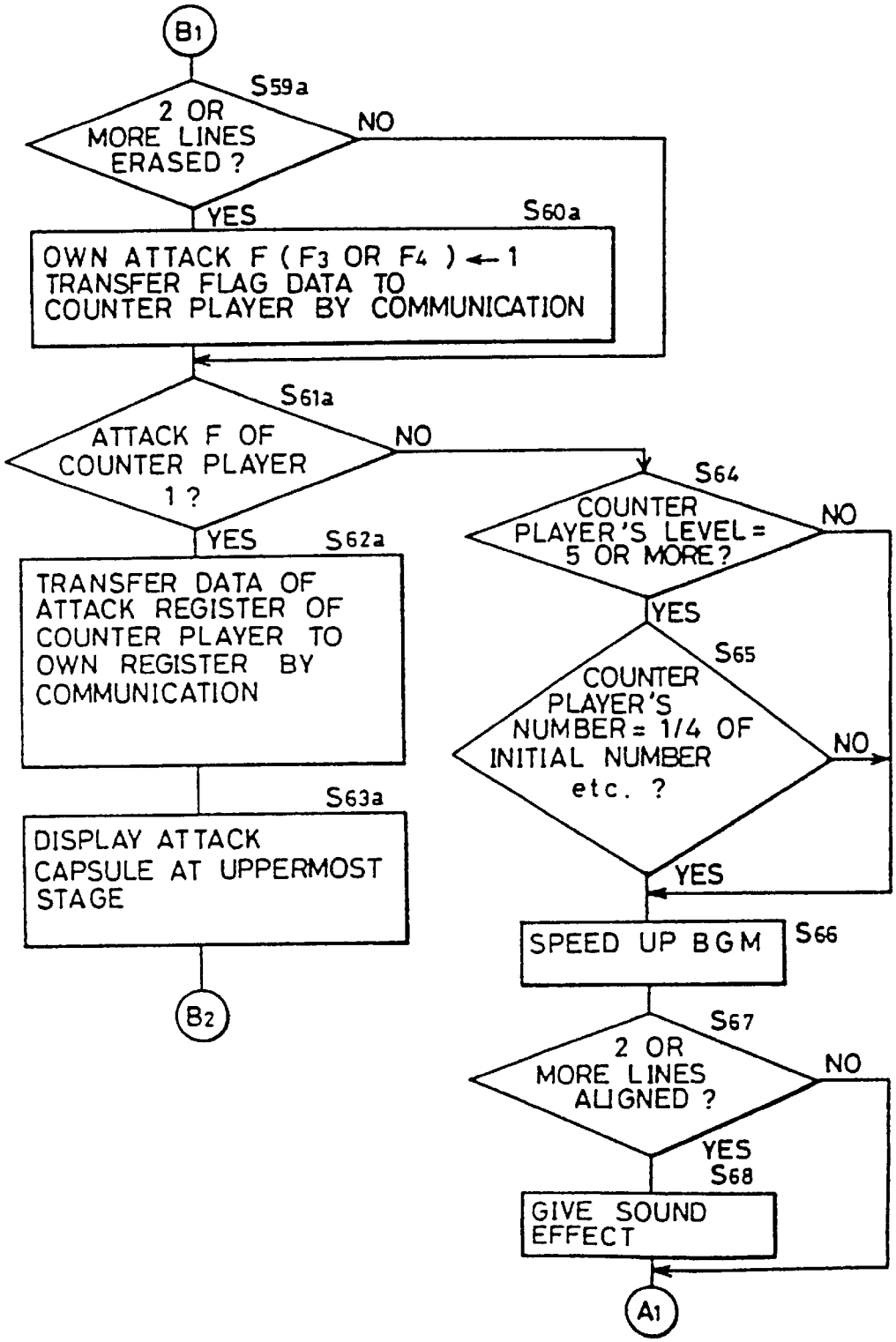
FIG. 9C is a flow chart showing a competition game subroutine, when the present invention is applied to a portable game machine having liquid crystal display.

In a game apparatus with a liquid crystal display, only black and white display can be provided by the display means, so that the types of capsules and viruses are displayed by density. Therefore, density codes are written in registers R22, R23, R27 and R28 shown in FIG. 4. The flow chart of the operation program is the same as that of the TV game machine if the operation mode is one-player game mode. As a game process for the [two player] *two-player* game mode, process shown in FIG. 9C is carried out in place of the process shown in FIG. 9B. The reason for this is that the display screen of the portable game apparatus is too small to give displays for two players in one machine, and therefore two game apparatuses are connected by a communication cable (not shown) so as to transfer data of game apparatuses to each other.

In step 59a, whether or not two or more lines of viruses and/or capsules have been erased by one [thrown] *dropped* capsule is determined, based on the data stored in the attack registers R9 to R12 or R13 to R16. If it is determined that two or more lines of uses and/or capsules have been erased, logic "1" representing attacking is written in the attack flag of the player's side in step 60a (namely, the attack flag F3 when the game process subroutine for the first player is being carried out, and the attack flag F4 when the game process subroutine for the second player is being carried out). In step 60a, data of the attack flag F3 and F4 are transferred to the portable game apparatuses of the players [to each other] through the communication cable, after the completion of the step 60a, and the flow proceeds to step 61a. If it is not determined in step 59a that two or more lines of vies and/or capsules have been erased, no attack is delivered on the counter player, so that the program skips the step 60a and directly proceeds to the step 61a. In step 61a, whether or not logic "1" has been set in the attack flag of the counter player is determined, by communication. At this time, if logic "1" is set in the attack flag of the counter player (the attack flag F4 when the game process subroutine for the first player is being carried out, and the attack flag F3 when the game process subroutine for the second player is being carried out), the program proceeds to step 62a. In step 62a, data of the attack register of the counter player is transferred by communication to the player's own attack register. Consequently, data representing an attack capsule (for example, a capsule whose size is one half of the capsule of FIG. 3 and having the same density as the density code transferred from the attack register of the counter player to his own attack register) are written to an address corresponding to the uppermost portion of a certain line of the [players] *player's* own buffer memory 141 or 142. In the next step 63a, an attack capsule is displayed on the uppermost portion of the object displaying area. The number of attack capsules displayed at this time is determined corresponding to the number of lines of the erased capsules and/or viruses of the counter player side. Then, the program returns to step 55 to make the attack capsule fall.

Meanwhile, in step 61a, if it is determined that logic "1" is not set in the attack flag of the counter player, the program proceeds to step 64. In step 64, whether or not the virus level set in the game apparatus of the counter player is at least five is determined. If the set virus level is five or more, it is determined whether the number of remaining viruses of the counter player has become ¼, ⅛ or 1/16 of the initially set number. If one of [this] *these* condi[tion]*tions* is satisfied, the speed of BGM (Background Music) or effect sound is increased in step 66, so as to let the player know the state of the game of the counter player. The state of the game of the counter player is informed by the music, since the state of the game of the counter player cannot be monitored, as the screen of the portable game apparatus is too narrow to give display of the game of two players. In step 67, whether or not two or more lines of continuously aligned capsules and/or viruses have generated for one [throwing] *dropping* of a capsule is determined. If there are two or more lines of continuously aligned viruses and/or capsules, an effect sound is generated in step 68, so as to tell that there will be an attack on the counter player. Then the program returns to step 42.

Although the number of viruses is changed dependent on the set virus level, the number of stacks of the viruses may be changed dependent on the set virus level. The closer the display line of the uppermost stage of the viruses comes to the uppermost portion of the object displaying area, the more difficult it is to position the dropped capsule, so that the degree of difficulty increases.

As described above, according to the present invention, a novel apparatus including many factors for influencing the complexity and the variety of a game which are attractive to users can be realized. In addition, by setting the difficulty variously, the interest of the game to the different players can be varied. Further, in the two-player game mode, the degree of game difficulty using two different factors can be independently set for each player, so that the players can be handicapped dependent on their skill, and the handicap can be varied. Therefore, each player can enjoy close competition irrespective of the difference in skill.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A game apparatus for use in playing a game comprising:

a display having an object display area defined by a predetermined shape for displaying a plurality of different types of first [and second] objects *and a plurality of second objects*, each different type of first [and second objects] *object* having distinguishing display characteristics;

operating means for allowing a player to interactively operate objects in the object display area, wherein the display status changes based on command signals from the operating means and on data generated automatically and independently from the signals from the operating means;

first object data generating means for randomly selecting the type of a first object and for intermittently generating data for displaying first objects with randomly selected [types] *display characteristics* throughout the game;

second object data generating means for randomly selecting the [type and] position of a second object [fixedly] displayed in the object display area and for generating data for displaying the second objects [of the selected type] at the selected positions at the start of the game;

stacked state detecting means for detecting when a first object moving across the object display area stops moving upon contact with a second object or a stationary first object;

[continuously aligned state] means for detecting whether at least a prescribed number of objects of a particular [type] *display characteristic* are [continuously aligned] *abutting*; and display control means for erasing display of the objects detected as [continuously aligned] *abutting*.

2. A game apparatus according to claim 1, wherein the display control means further comprises:

means for displaying at least one second object of [the] *a* selected [type] *display characteristic* at the selected display position based on data generated by the second object data generating means;

means for displaying at least one first object as moving vertically at a prescribed speed from an upper to a lower region of the object displaying area based on the data generated from the first object data generating means;

means for changing the display of a first object based on an operation of the operating means; and means for stopping movement of the first object in response to a detection output from the stacked state detecting means.

3. A game apparatus according to claim 2 wherein the predetermined shape of the object display area is a bottle with the opening to the bottle [is] located in the upper region.

4. A game apparatus according to claim 1 wherein each first object is divided into plural sections with each section [being] *having* a different [type] *display characteristic* and the [continuously aligned state] means *for detecting* detects whether at least the prescribed number of first object sections of the same [type] *display characteristic* or first object section [and second objects] of the same [type] *display characteristic and second objects* are [continuously aligned] *abutting* such that the display control means erases display of first object sections and second objects detected as [continuously aligned] *abutting*.

5. A game apparatus according to claim 4 wherein the display control means causes a first object section previously incorporated with a currently erased first object section or previously contacting a currently erased second object to move across the display until it contacts another object or a boundary of the display area.

6. A game apparatus according to claim 1 wherein the prescribed number of *abutting* objects of a certain [type continuously aligned] *display characteristic* is smaller than a total number of objects that can be displayed in a dimension of the display area.

7. A game apparatus according to claim 1 wherein the [continuously aligned state] means *for detecting* detects whether at least four objects of a particular [type] *display characteristic* are [continuously aligned] *abutting* in a vertical or horizontal direction across the object display area.

8. A game apparatus according to claim 1 wherein the display is a color display and a distinguishing characteristic of the first and second objects is color, the first object generating means generating first object color data designating colors of first objects and the second object data generating means generating second object color data designating colors of second objects, said display control means displaying the first and second objects on the color display in accordance with the first and second object color data, respectively.

9. The game apparatus according to claim 1 wherein a distinguishing characteristic of first and second objects is *an* image gray scale level density, the first object generating means generating first object gray scale level density data designating gray scale level densities of first objects and the second object data generating means including means for generating second object gray scale level density data designating gray scale level densities of second objects, said display control means displaying the first and second objects on the display in accordance with the first and second object gray scale level density data, respectively.

10. The game apparatus according to claim [7] *2* wherein the distinguishing *display* characteristic is object shape such that the first and second object data generating means generates character data for displaying characters of first and second shapes, respectively, and the display control means displays the first and second objects as different first and second shapes, respectively.

11. The game apparatus according to claim 10 wherein the first and second objects are displayed as having the same gray scale level density based on the character data and gray scale level density data generated by the first and second object data generating means.

12. The game apparatus according to claim 1, further comprising:

means for detecting a first game status when all of the second objects have been erased, and means for halting generation of first object data from the first object data generating means in response to detection of the first game status.

13. The game apparatus according to claim 1, further comprising:

means for detecting a second game status when a first object is displayed at the uppermost boundary of the object display area, and means for halting generation of first object data from the first object data generating means in response to detection of the second game status.

14. The game apparatus according to claim 1 wherein [continuously aligned detecting] *the* means [further includes: means] for detecting *detects* first [and second] objects of a particular [type] *display characteristic and second objects* being continuously aligned in either a vertical or a horizontal direction in the display area.

15. The game apparatus according to claim 1 wherein two players may play the game using corresponding displays and operational means.

16. A game apparatus according to claim 15, further comprising:

means for selectively adjusting the competition level for either of the two players by changing the speed at which first objects move across the object display area.

17. A game apparatus according to claim 15, further comprising:

means for selectively adjusting the competition level for either of the two players by changing the number of second objects generated by the second object generating means.

18. A game apparatus for use in playing a game, comprising:

a display having an object display area defined by a predetermined shape for displaying a plurality of different types of first and second objects, each different type of first and second objects having distinguishing display characteristics;

operating means for allowing a player to interactively operate objects in the object display area, wherein the display status changes based on command signals from the operating means and on data generated automatically and independently from the signal from the operating means;

first difficulty setting means for variably setting a degree of difficulty with respect to a first change of the game based on player performance;

second difficulty setting means for variably setting the degree of difficulty with respect to a second change in the game based on player performance;

first object generating means for randomly selecting characteristics of a first object and for intermittently generating data for displaying first objects having the selected characteristics during the game;

second object data generating means for randomly selecting the characteristics and display position for a second object and for generating data for displaying the second object having the selected characteristics and display position depending upon the degree of difficulty set by the second difficulty setting means;

stacked state detecting means for detecting when at least a portion of a first object moving across the object display area stops moving upon contact with the second object or a stationary first object;

continuously aligned state detecting means for detecting whether at least a prescribed number of objects of a certain type are continuously aligned; and display control means for erasing display of the objects detected as continuously aligned.

19. A game apparatus according to claim 18 wherein the display control means further comprises:

means for displaying at least one second object of the selected type at the selected display position based on data generated by the second object data generating means;

means for displaying at least one first object as moving vertically at a prescribed speed corresponding to the degree of difficulty set by the first degree of difficulty setting means;

means for changing the display of a first object based on an operation of the operating means; and means for stopping movement of the first object in response to a detection output from the stacked state detecting means.

20. A game apparatus according to claim 18 further comprising:

game mode selecting means for selecting a [one player] *one-player* game mode or a two-player game mode, wherein the first and second difficulty setting means include means for respectively setting the degree of difficulty for each player.

21. A game apparatus according to claim 20 wherein:

the first object data generating means generate data for displaying the first object separately for each player;

the second object data generating means generates the number of second objects generated separately for each player based on the degree of difficulty set by the second difficulty setting means;

the display control means separately [displays] *display* the object displaying area for each player, separately changes the number of displayed second objects for each player based on the set degree of difficulty for each player, and separately changes the speed of movement of the first object across the object display area corresponding to the degree of difficulty set for each player, the continuously aligned state detecting means separately detects at least a prescribed number of the first objects and second objects of a certain type continuously aligned in each of the separate object displaying areas, and the display control means erases display of first and second objects detected as continuously aligned in response to detection of a continuously aligned state occurring in the object display area for each player.

22. A game apparatus according to claim 18 wherein the display control means causes a first object to move automatically into the object display area of one player in response to detection of a continuously aligned state in the display area of the other player.

*23. A game apparatus in which objects are displayed on a display having an object displaying area capable of displaying a plurality of first objects and/or second objects moving in vertical and lateral directions, wherein a status of display on the display is changed based on operation of operating means by a player and based on data generated automatically and irregularly independent from the operation of the player, comprising:*

*first object data generating means for selecting at random a type of said first object and for generating intermittently data for displaying the first object of the selected type during game play;*

*second object data generating means for displaying, at the start of game play, the second object for blocking a falling passage of said first object, said second object being of a type different from that of said first object;*

*stacked state detecting means for detecting at least a portion of said falling first object being stacked on said second object or a first object which has fallen and is now displayed fixedly;*

*display controlling means for displaying said second object at a position of display of said object displaying area based on data generated by said second object data generating means, displaying said first object of the selected type as falling at a prescribed speed from an upper portion of said object displaying area based on the data generated from said first object data generating means, changing position of display of the falling first object based on an operation of said operating means, and for stopping falling of the first object in response to a detection output from said stacked state detecting means; and*

*concatenation state detection means for detecting, after said stacked state detecting means has detected a stacked state, a run of at least a prescribed number of at least said first objects of a certain type displayed in said object displaying area being concatenated, the prescribed number of the objects being smaller than the maximum number of objects which can be displayed on the display; wherein*

*said display controlling means erases display of the first objects or second objects which are detected to be concatenated by said concatenation state detection means, and displays another first object previously supported by the erased first object or second object as now falling successively.*

*24. A game apparatus according to claim 23, wherein said first object is displayed as a combination of at least two portions, and colors of said portions specifies a kind of said first object.*

*25. A game apparatus according to claim 23, wherein one or more of the second objects are transparent when displayed.*

*26. A game apparatus in which objects are displayed on a display where the status of the display is changed based on operation of an operating device by a player and data generated independently from the operation of the operating device by the player, comprising:*

*a first object data generator for selecting a characteristic of a first object and for generating data for displaying the first object with the selected characteristic as moving across the display;*

*a second object data generator for generating data for displaying a second object different for the first object at a position on the display;*

*a contact state detector for detecting at least a portion of the first object contacting another first object or a second object;*

*a display controller for displaying the second object at a position on the display based on data generated by the second object data generator, displaying the first object with the selected characteristic as moving at a prescribed speed across the display based on data generated by the first object data generator, changing a displayed position of the moving first object based on operation of the operating device, and stopping movement of the first object in response to an output from the contact state detector; and*

*a chain state detector for detecting after the contact state detector detects the state, a chain of a prescribed number of contiguous first objects having the selected characteristic,*

*wherein the display controller erases display of the detected chain of first objects in response to an output from the chain state detector.*

*27. The game apparatus according to claim 26, wherein second objects which are detected to be in a prescribed relationship with the erased first objects are also erased by the display controller.*

*28. The game apparatus according to claim 26, wherein after the first objects are erased, the display controller displays a first object previously supported by an erased object continuing movement across the display.*

*29. The game apparatus according to claim 26, wherein the first object is divided into portions, and colors of those portions specify the characteristic of the first object.*

*30. The game apparatus according to claim 25, wherein the characteristic of the first object is color and wherein the second object is transparent when displayed.*

*31. The game apparatus according to claim 26, wherein the second objects impede the ability to attain the chain of the prescribed number of contiguous first objects.*

*32. A method for playing a game in which objects are displayed on a display and the status of the display is changed based on operation of an operating device by a player and data generated independent from operation of the operating device by the player, comprising the steps of:*

*selecting a characteristic of first objects and generating data for displaying the first objects with different selected characteristics as moving across the display;*

*moving first objects of the selected characteristics across the display;*

*changing a display position of the moving first object based on an operation of the operating device;*

*displaying one or more second objects different from the first objects at a position in the display;*

*detecting when at least a portion of the first object contacts the second object or another first object currently displayed at a fixed position in the display and stopping movement of the first object upon such contact;*

*detecting when a prescribed number of first objects having the selected characteristic contiguously contact one another on the display; and*

*erasing display of the prescribed number of contiguously contacting first objects.*

*33. The method according to claim 32 further comprising the step of erasing display of second objects which are abutting to the erased first objects.*

*34. The method according to claim 33 further comprising the step of displaying a first object previously supported by a now erased object as continuing movement across the display.*

*35. The method according to claim 32, wherein the characteristic is color and wherein the second object appears transparent on the display.*

*36. The method according to claim 32, wherein the one or more second objects limit potential contiguous contact of some first objects having the selected characteristic.*

*37. The apparatus according to claim 1, wherein the characteristic is color and one or more of the second objects appear transparent on the display.*

*38. A game apparatus for permitting first and second players to play a game, comprising:*

*a display, including a first display region for playing the game by the first player and a second display region for playing the game by a second player, for displaying objects of different types in the first and second display regions;*

*first and second game playing devices operable by the first and second players, respectively, to permit the players to interactively participate in playing the game in the first and second display regions, respectively, such that operation of the game playing devices by the players changes positions of the objects in the display regions;*

*an object data generator for generating display data for displaying the objects of different types;*

*a contact state detector for detecting when objects contact;*

*a display controller for displaying at least some of the objects as moving across each of the first and second display regions based on data generated from the object data generator and changing a displayed position of moving objects based on operation of the playing devices; and*

*a chain state detector for detecting, in response to the contact state detector detecting contacting objects, a chain of a prescribed number of contacting objects having a same type,*

*wherein the display controller erases display of the contacting objects in response to an output from the chain state detector, and wherein obstacles are introduced into the second display region when another prescribed number of contacting objects are erased in the first display region.*

*39. The game apparatus according to claim 38, wherein one or more of the obstacles are erased when a prescribed relationship exists between one of the obstacles and contacting objects to be erased.*

*40. The game apparatus according to claim 38, wherein after objects are erased, the display controller displays objects previously supported by an erased object as moving across the display.*

*41. The game apparatus according to claim 38, wherein the game may be played at different levels of difficulty individually selected by each of the first and second players.*

*42. The game apparatus according to claim 38, wherein some of the objects move from an upper portion of the display regions to a lower portion of the display region.*

*43. A method for playing a game by first and second players, comprising the steps of:*

*displaying on a first display region and on a second display region objects of different types moving across display;*

*providing first and second playing devices operable by the first and second players to manipulate moving objects displayed in the first and second display regions;*

*determining when objects contact in each display region;*

*detecting when a prescribed number of objects of a same type contact;*

*erasing display of the prescribed number of contacting objects; and*

*introducing obstacles into the second display region when another prescribed number of contacting objects are erased in the first display region.*

*44. The method according to claim 43, further comprising:*

*erasing one or more of the obstacles when a prescribed relationship exists between one of the obstacles and contacting objects to be erased.*

*45. The method according to claim 43, wherein after objects are erased, the display controller displays objects previously supported by an erased object as moving across the display.*

*46. The method according to claim 43, wherein the game may be played at different levels of difficulty individually selectable by each of the first and second players.*

*47. The method according to claim 43, wherein some of the objects move from an upper portion of the display regions to a lower portion of the display regions.*

*48. A game apparatus according to claim 1, wherein after the abutting objects are erased, the display control means causes a first object previously supported by one of the erased objects to move across the display until the first previously supported object contacts another object or a boundary of the display area, and wherein the display control means erases display of a newly-formed group of abutting objects now including the first previously supported object when the newly-formed group of abutting objects is detected as having at least the prescribed number of objects of a particular characteristic.*

*49. A game apparatus according to claim 48, wherein the display control means does not introduce display of a new first object in the object display area until no further group of abutting objects having at least the prescribed number of objects of a particular characteristic can be newly-formed.*

*50. A game apparatus according to claim 18, wherein after the abutting objects are erased, the display control means causes a first object previously supported by one of the erased objects to move across the display until the first previously supported object contacts another object or a boundary of the display area, and wherein the display control means erases display of a newly-formed group of contacting objects now including the first previously supported object when the newly-formed group of contacting objects is detected as having at least the prescribed number of objects of a certain type.*

*51. A game apparatus according to claim 50, wherein the display control means does not introduce display of a new first object in the object display area until no further group of contacting objects having at least the prescribed number of objects of a certain type can be newly-formed.*

*52. A game apparatus according to claim 23, wherein after the concatenated objects are erased, the display controlling means causes a first object previously supported by one of the erased objects to move across the display until the first previously supported object contacts another object or a boundary of the object displaying area, and wherein the display controlling means erases display of a newly-formed run of concatenated objects now including the first previously supported object when the newly-formed run of concatenated objects is detected as having at least the prescribed number of at least said first objects of a certain type.*

*53. A game apparatus according to claim 52, wherein the display controlling means does not introduce display of a new first object in the object displaying area until no further run of concatenated objects having at least the prescribed number of at least said first objects of a certain type can be newly-formed.*

*54. A game apparatus according to claim 26, wherein after the contiguous objects are erased, the display controller causes a first object previously supported by one of the erased objects to move across the display until the first previously supported object contacts another object or a boundary of the display, and wherein the display controller erases display of a newly-formed chain of contiguous objects now including the first previously supported object*

*when the newly-formed chain of contiguous objects is detected as having at least the prescribed number of contiguous first objects having the selected characteristic.*

*55. A game apparatus according to claim 54, wherein the display controller does not introduce a new first object on the display until no further chain of contiguous objects having at least the prescribed number of contiguous first objects having the selected characteristic can be newly-formed.*

*56. The method according to claim 32, wherein after the contiguous objects are erased, the method further comprises:*

*moving a first object previously supported by one of the erased objects across the display until the first previously supported object contacts another object or a boundary of the display,*

*erasing display of a newly-formed chain of contiguous objects now including the first previously supported object when the newly-formed chain of contiguous objects is detected as having at least the prescribed number of contiguous first objects having the selected characteristic.*

*57. A method according to claim 56, wherein a new first object is introduced on the display only when no further chain of contiguous objects having at least the prescribed number of contiguous first objects having the selected characteristic can be newly-formed.*

*58. A game apparatus according to claim 38, wherein after the contacting objects are erased, the display controller causes a first object previously supported by one of the erased objects to move across the either the first or the second display region until the first previously supported object contacts another object or a boundary of the first or second display regions, and wherein the display controller erases display of a newly-formed chain of contacting objects now including the first previously supported object when the newly-formed chain of contacting objects is detected as having at least the prescribed number of contacting objects having the same type.*

*59. A game apparatus according to claim 58, wherein the display controller does not introduce a new first object into the first or second display regions until no further chain of contacting objects having at least the prescribed number of contacting objects having the same type can be newly-formed.*

*60. The method according to claim 43, wherein after the contiguous objects are erased, the method further comprises:*

*moving a first object previously supported by one of the erased objects across either of the first or second display regions until the first previously supported object contacts another object or a boundary of either of the first or second display regions, and*

*erasing display of a newly-formed chain of contacting objects now including the first previously supported object when the newly-formed chain of contacting objects is detected as having at least the prescribed number of contacting objects.*

*61. A method according to claim 60, wherein a new first object is introduced into either of the first or second display regions only when no further group of contacting objects having at least the prescribed number of contacting objects can be newly-formed.*

* * * * *